United States Patent
Singh et al.

(10) Patent No.: US 12,538,318 B2
(45) Date of Patent: Jan. 27, 2026

(54) METHODS PROVIDING DOWNLINK CONTROL INFORMATION AND DOWNLINK DATA USING OVERLAPPING RESOURCES AND RELATED COMMUNICATION DEVICES AND RADIO ACCESS NETWORK NODES

(71) Applicant: Telefonaktiebolaget LM Ericsson (publ), Stockholm (SE)

(72) Inventors: Bikramjit Singh, Kirkkonummi (FI); Kittipong Kittichokechai, Järfälla (SE); Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 287 days.

(21) Appl. No.: 18/010,568

(22) PCT Filed: Jun. 16, 2021

(86) PCT No.: PCT/SE2021/050584
§ 371 (c)(1),
(2) Date: Dec. 15, 2022

(87) PCT Pub. No.: WO2021/256980
PCT Pub. Date: Dec. 23, 2021

(65) Prior Publication Data
US 2023/0328744 A1    Oct. 12, 2023

Related U.S. Application Data

(60) Provisional application No. 63/041,200, filed on Jun. 19, 2020.

(51) Int. Cl.
*H04W 72/23* (2023.01)
*H04W 72/0446* (2023.01)
(Continued)

(52) U.S. Cl.
CPC ....... *H04W 72/23* (2023.01); *H04W 72/0446* (2013.01); *H04W 72/0453* (2013.01); *H04W 72/11* (2023.01)

(58) Field of Classification Search
CPC ............. H04W 72/23; H04W 72/0446; H04W 72/0453; H04W 72/11; H04L 5/0051; H04L 5/0044; H04L 5/0053
See application file for complete search history.

(56) References Cited

U.S. PATENT DOCUMENTS

2021/0153202 A1* 5/2021 Takeda .............. H04W 72/0446

FOREIGN PATENT DOCUMENTS

WO    2019216599 A1    11/2019

OTHER PUBLICATIONS

International Search Report and Written Opinion dated Oct. 4, 2021 for International Application No. PCT/SE2021/050584 filed Jun. 16, 2021, consisting of 12-pages.
(Continued)

*Primary Examiner* — Dady Chery
(74) *Attorney, Agent, or Firm* — Weisberg I.P. Law, P.A.

(57) ABSTRACT

A method of operating a communication device in a communication network is provided. The communication device is configured with resources for monitoring physical downlink channel, PDCCH, candidates, where the resources at least in part overlaps with resources configured for semi-persistent scheduling, SPS, of a physical downlink shared channel, PDSCH. The method includes monitoring PDCCH candidates on the configured PDCCH resources. If a PDCCH is successfully decoded for the configured PDCCH resources, the method includes decoding a PDSCH, on the resources configured for SPS PDSCH, where the PDSCH is rate-matched around the PDCCH resource according to the PDCCH decoding. If a PDCCH is not successfully decoded, (Continued)

the method includes decoding PDSCH on the resources configured for SPS PDSCH. There is also presented a communication device, a radio access network node and a method therefore.

18 Claims, 17 Drawing Sheets

(51) Int. Cl.
*H04W 72/0453* (2023.01)
*H04W 72/11* (2023.01)

(56) References Cited

OTHER PUBLICATIONS

3GPP TS 38.213 V16.1.0; 3rd Generation Partnership Project; Technical Specification Group Radio Access Network; NR; Physical layer procedures for control (Release 16); Mar. 2020, consisting of 156-pages.

3GPP TS 38.214 V16.1.0; 3rd Generation Partnership Project; Technical Specification Group Radio Access Network; NR; Physical layer procedures for data (Release 16); Mar. 2020, consisting of 151-pages.

3GPP TS 38.215 V16.1.0; 3rd Generation Partnership Project; Technical Specification Group Radio Access Network; NR; Physical layer measurements (Release 16); Mar. 2020, consisting of 22-pages.

3GPP TSG RAN WG1 Meeting #94 R1-1808382; Title: Corrections on rate matching; Agenda Item: 7.1.3.5; Source: CATT; Document for: Discussion and Decision; Date and Location: Aug. 20-24, 2018, Gothenburg, Sweden, consisting of 5-pages.

3GPP TSG RAN WG1 Meeting #92 R1-1801349; Title: Remaining issues on reserved resources and rate-matching; Agenda Item: 7.1.3.5; Source: Huawei, HiSilicon; Document for: Discussion and decision; Date and Location: Feb. 26-Mar. 2, 2018, Athens, Greece, consisting of 5-pages.

\* cited by examiner

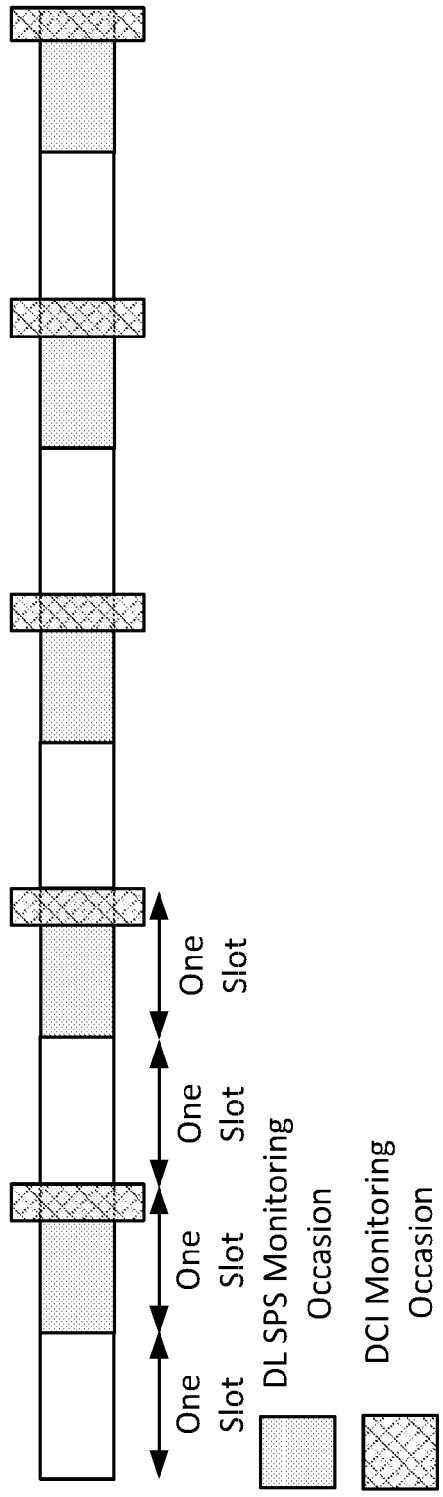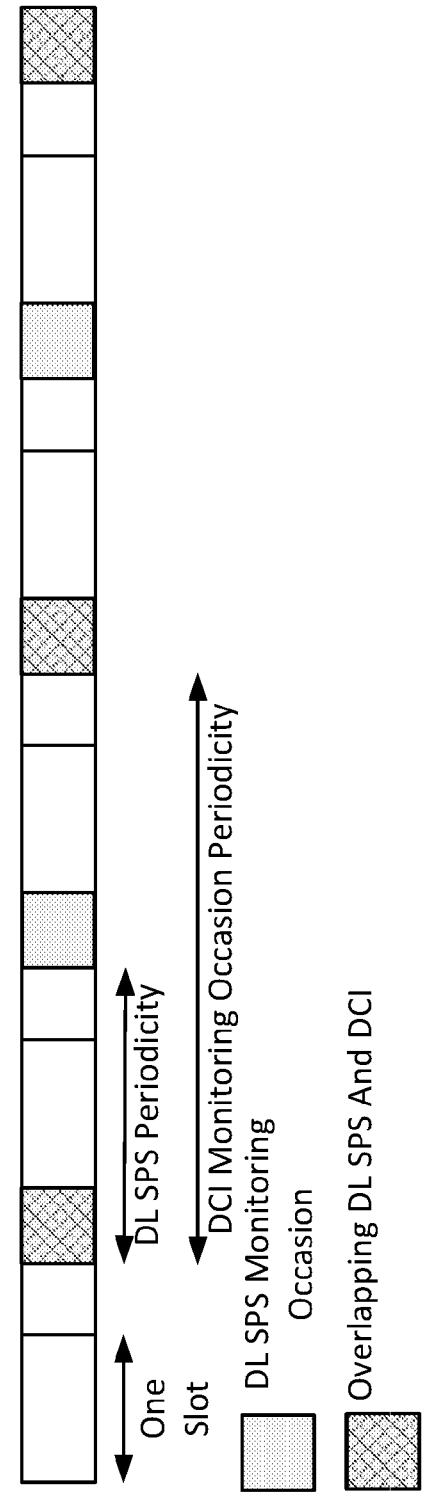

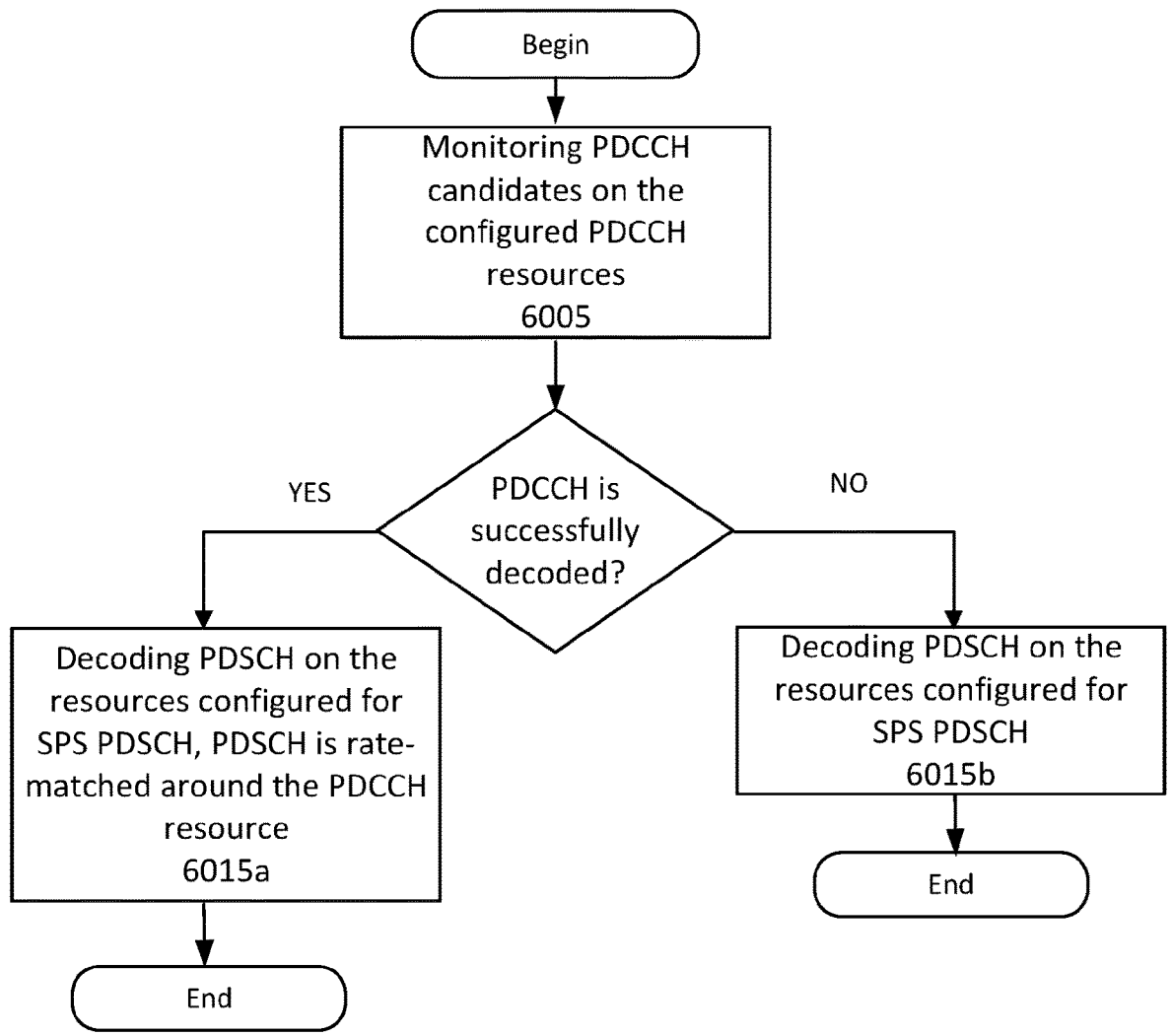

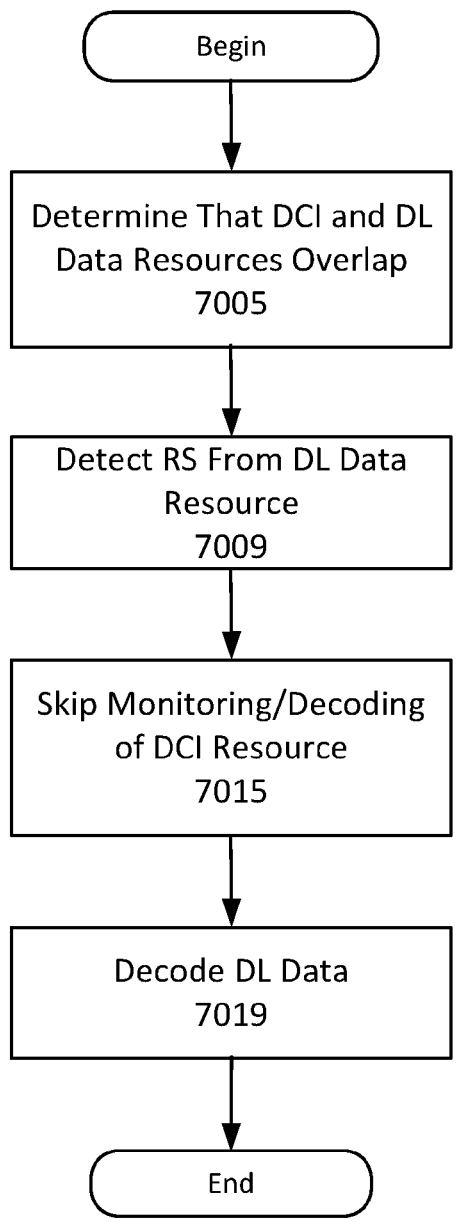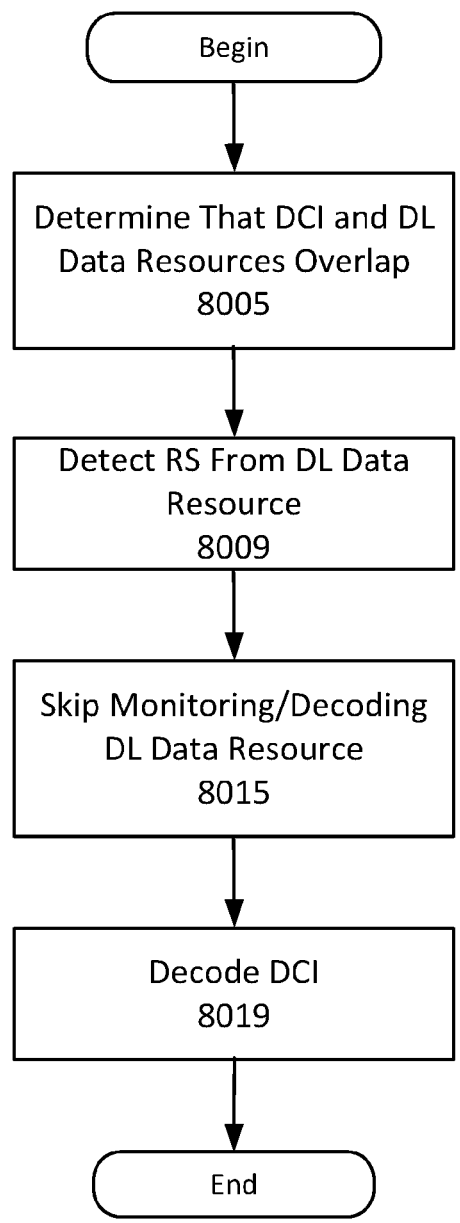

METHODS PROVIDING DOWNLINK CONTROL INFORMATION AND DOWNLINK DATA USING OVERLAPPING RESOURCES AND RELATED COMMUNICATION DEVICES AND RADIO ACCESS NETWORK NODES

CROSS-REFERENCE TO RELATED APPLICATIONS

This application is a Submission Under 35 U.S.C. § 371 for U.S. National Stage Patent Application of International Application No.: PCT/SE2021/050584, filed Jun. 16, 2021 entitled "METHODS PROVIDING DOWNLINK CONTROL INFORMATION AND DOWNLINK DATA USING OVERLAPPING RESOURCES AND RELATED COMMUNICATION DEVICES AND RADIO ACCESS NETWORK NODES," which claims priority to U.S. Provisional Application No. 63/041,200, filed Jun. 19, 2020, entitled "METHODS PROVIDING DOWNLINK CONTROL INFORMATION AND DOWNLINK DATA USING OVERLAPPING RESOURCES AND RELATED COMMUNICATION DEVICES AND RADIO ACCESS NETWORK NODES," the entireties of both of which are incorporated herein by reference.

The present disclosure relates generally to communications, and more particularly to communication methods and related devices and nodes supporting wireless communications.

Physical Downlink Control Channel (PDCCH) is used to schedule Downlink Control Information (DCI) to a UE. The DCI includes downlink resource allocation of the shared data channel.

With semi-persistent scheduling, SPS, the device is provided with the scheduling decision on the control channel, together with an indication that this applies to every nth subframe or slot until further notice. Hence, control signaling is only used once and the overhead is reduced.

In existing communication systems such as new radio, NR, a UE monitors control channel candidates and downlink semi-persistent scheduled, DL SPS, data transmission according to configured resources. For example, for a control channel such as PDCCH, the UE monitors PDCCH candidates at the corresponding PDCCH resources by following PDCCH monitoring occasions as configured by search space sets and CORESET configurations. For DL SPS, the UE decodes physical downlink shared channel, PDSCH, following the configured DL SPS occasions as configured by periodicity in SPS-config IE.

If configured PDCCH and DL SPS resources overlap, e.g., in the time-domain, then this can affect the performance of the system.

SUMMARY

According to some embodiments of inventive concepts, a method of operating a communication device in a communication network is provided. The communication device is configured with resources for monitoring physical downlink channel, PDCCH, candidates, where the resources at least in part overlaps with resources configured for SPS PDSCH. The method includes monitoring PDCCH candidates on the configured PDCCH resources. If a PDCCH is successfully decoded for the configured PDCCH resources, the method includes decoding a PDSCH, on the resources configured for SPS PDSCH, where the PDSCH is rate-matched around the PDCCH resource according to the PDCCH decoding. If a PDCCH is not successfully decoded, the method includes decoding PDSCH on the resources configured for SPS PDSCH.

According to some other embodiments of inventive concepts, a method of operating a radio access network RAN node in a communication network is provided, the RAN node configuring a communication device with resources for monitoring PDCCH candidates, where the resources at least in part overlaps with resources configured for SPS PDSCH. The method includes assigning a PDCCH to resources configured for PDCCH. The method further includes assigning a PDSCH to the resources configured for SPS, where the PDSCH is rate-matched around the PDCCH resource for the communication device, where the PDCCH resource and the PDSCH resource overlap. Furthermore, the method includes transmitting at least one of the PDCCH and PDSCH.

According to some embodiments of inventive disclose herein, performance and/or efficiency may be improved by facilitating overlapping downlink data and control resources.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a diagram illustrating overlapping SPS and DCI monitoring occasions configured with a same periodicity according to some embodiments of inventive concepts;

FIG. 2 is a diagram illustrating overlapping SPS and DCI monitoring occasions configured with different periodicities according to some embodiments of inventive concepts;

FIGS. 6 7, 8, and 9 are flow charts illustrating operations of communication devices according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 3:
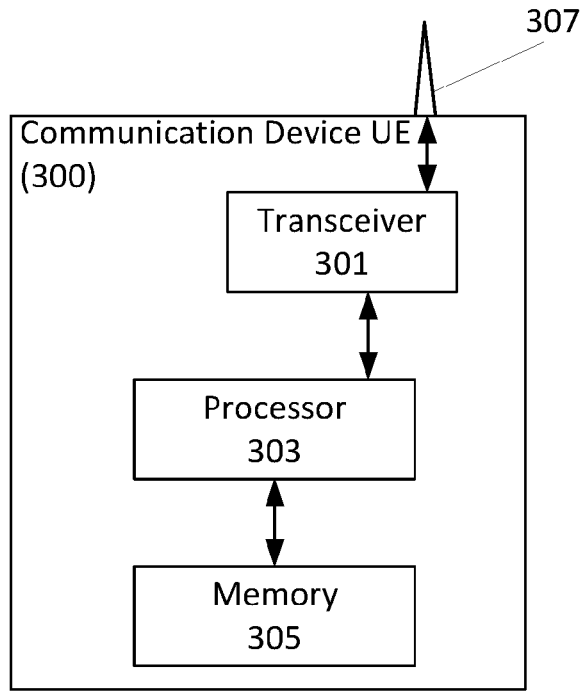
FIG. 3 is a block diagram illustrating a wireless device UE according to some embodiments of inventive concepts.

FIG. 3 is a block diagram illustrating elements of a communication device UE 300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 300 may be provided, for example, as discussed below with respect to wireless device 4110 of FIG. 13.) As shown, communication device UE may include an antenna 307 (e.g., corresponding to antenna 4111 of FIG. 13), and transceiver circuitry 301 (also referred to as a transceiver, e.g., corresponding to interface 4114 of FIG. 13) including a transmitter and a receiver configured to provide uplink and downlink radio communications with a base station(s) (e.g., corresponding to network node 4160 of FIG. 13, also referred to as a RAN node) of a radio access network. Communication device UE may also include processing circuitry 303 (also referred to as a processor, e.g., corresponding to processing circuitry 4120 of FIG. 13) coupled to the transceiver circuitry, and memory circuitry 305 (also referred to as memory, e.g., corresponding to device readable medium 4130 of FIG. 13) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device UE may also include an interface (such as a user interface) coupled with processing circuitry 303, and/or communication device UE may be incorporated in a vehicle.

As discussed herein, operations of communication device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless communication devices). According to some embodiments, a communication device UE 300 and/or an element(s)/function(s) thereof may be embodied as a virtual node/nodes and/or a virtual machine/machines.

Figure 4:
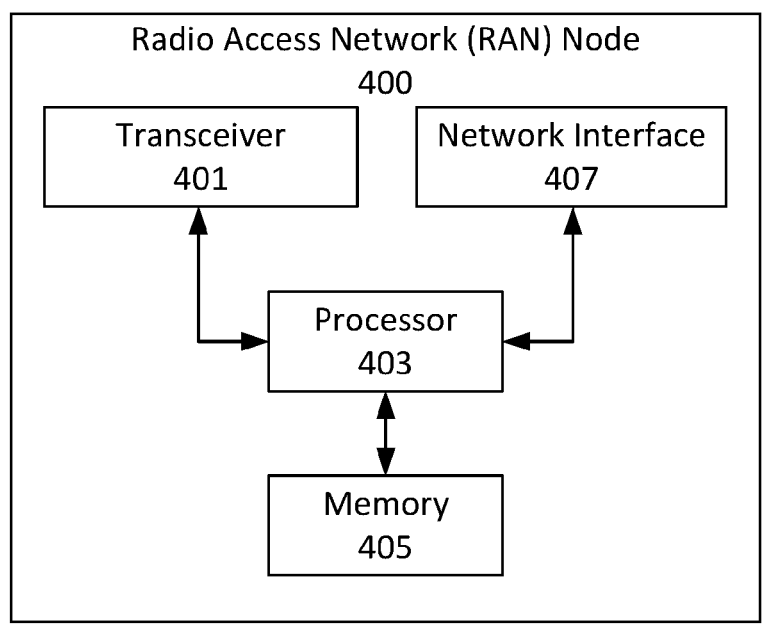
FIG. 4 is a block diagram illustrating a radio access network RAN node (e.g., a base station eNB/gNB) according to some embodiments of inventive concepts.

FIG. 4 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 4160 of FIG. 13.) As shown, the RAN node may include transceiver circuitry 401 (also referred to as a transceiver, e.g., corresponding to portions of interface 4190 of FIG. 13) including a transmitter and a receiver configured to provide uplink and downlink radio communications with mobile terminals. The RAN node may include network interface circuitry 407 (also referred to as a network interface, e.g., corresponding to portions of interface 4190 of FIG. 13) configured to provide communications with other nodes (e.g., with other base stations) of the RAN and/or core network CN. The network node may also include processing circuitry 403 (also referred to as a processor, e.g., corresponding to processing circuitry 4170) coupled to the transceiver circuitry, and memory circuitry 405 (also referred to as memory, e.g., corresponding to device readable medium 4180 of FIG. 13) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes). According to some embodiments, RAN node 400 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 5:
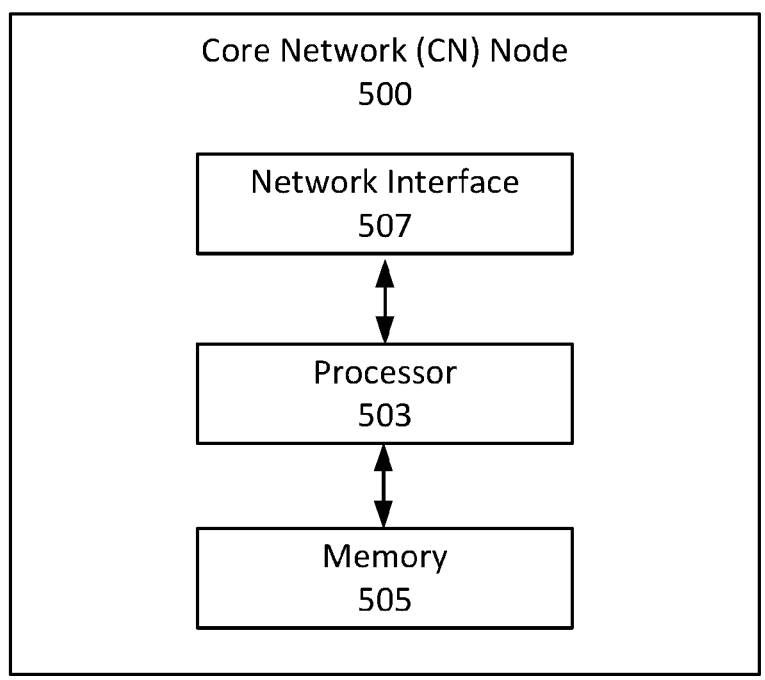
FIG. 5 is a block diagram illustrating a core network CN node (e.g., an AMF node, an SMF node, etc.) according to some embodiments of inventive concepts.

FIG. 5 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes). According to some embodiments, CN node 500 and/or an element(s)/function(s) thereof may be embodied as a virtual node/nodes and/or a virtual machine/machines.

In existing systems, e.g., NR, a UE monitors PDCCH candidates in configured resources and may at the same time be configured for DL SPS transmission in the same resources. For example, for PDCCH, the UE monitors PDCCH candidates at the corresponding PDCCH resources by following PDCCH monitoring occasions as configured by search space sets and CORESET configurations. For DL SPS, the UE decodes PDSCH following the configured DL SPS occasions as configured by periodicity in SPS-config Information Element IE.

If configured PDCCH and DL SPS resources overlap, e.g., overlap in time-domain, it can cause severe performance impact if both DCI and DL SPS are transmitted to the UE. To reduce/avoid such impacts, one possible approach is to configure resources in an orthogonal manner or configure reserved resource for PDCCH transmission where PDSCH is rate-matched around.

However, in some scenarios, there are no DCI or DL SPS transmission on the configured PDCCH monitoring or DL SPS occasions. The existing approaches using orthogonal configured resources or reserved resource can lead to resource inefficiency.

According to some embodiments of inventive concepts, PDSCH allocation is used to flexibly transmit data or control information (DCI) or both.

For example, when the configured PDCCH and PDSCH resources overlap (e.g., which can be a part of DL SPS or dynamic grant), the PDSCH resources can be used for PDSCH transmission in a flexible manner depending on whether DCI is transmitted on the overlapping PDCCH/DCI resource.

Section 10 of 3GPP TS 38.213 V16.1.0 (2020-03) discusses Downlink Control Information DCI transmission on a Physical Downlink Control Channel PDCCH.

An introduction of how a UE determines physical downlink control channel assignment is provided in Section 10.1 or 3GPP TS 38.213 V16.1.0 where the configuration of search space sets and CORESETs in which UE monitors PDCCH candidates are described.

DCI transmission over a Physical Downlink Shared Channel PDSCH resource is discussed below.

Dynamic PDSCH, multiplexing of DCI over a PDSCH resource, and the multiplexing behavior according to current specification are described below.

For a PDSCH scheduled by a PDCCH overlapping with the resources in the CORESET containing the scheduling PDCCH, the resource corresponding to a union of the detected PDCCH that scheduled the PDSCH and associated PDCCH DM-RS are not available for the PDSCH. That is, dynamically scheduled PDSCH is rate-matched around these unavailable resources.

As discussed in Section 5.1.4.1 of 3GPP TS 38.215 v16.1.0:

. . .

If a PDSCH scheduled by a PDCCH would overlap with resources in the CORESET containing the PDCCH, the resources corresponding to a union of the detected PDCCH that scheduled the PDSCH and associated PDCCH DM-RS are not available for the PDSCH. When precoderGranularity configured in a CORESET where the PDCCH was detected is equal to allContiguousRBs, the associated PDCCH DM-RS are DM-RS in all REGs of the CORESET. Otherwise, the associated DM-RS are the DM-RS in REGs of the PDCCH.

. . .

SPS's PDSCH is discussed below.

For DownLink DL Semi-Persistent Scheduling SPS transmission on DL SPS resource, the behavior is not explicitly defined. If PDCCH carrying a DCI would overlap with a certain DL SPS occasion, and both the DCI and DL SPS are transmitted, severe performance impact can be expected.

In New Radio NR, there exists a mechanism based on "reserved resources" as described in Section 5.1.4 in 3GPP TS 38.214, V16.1.0, where a User Equipment UE can be configured with reserved resources implying that these resources are not available to be used for PDSCH. More specifically, as described in Section 5.1.4.1 of 3GPP TS 38.214, a UE can be provided, e.g., with higher layer parameters rateMatchPatternGroup1 and rateMatchPatternGroup2 indicating that some resource elements (REs) are not available for PDSCH. In the scenario of multiplexing of PDCCH over DL SPS resource, if Control Resource Set CORESET containing PDCCH is included in the rateMatchPattern as reserved resources, then the collision of PDCCH and DL SPS mentioned above can be reduced/avoided. In other words, it is possible to multiplex PDCCH and PDSCH in the form of rate-matching if the Radio Access Network node gNB configures to the UE reserved resources corresponding to the CORESETs used for PDCCH.

PCSCH resource mapping is discussed in Section 5.1.4 of 3GPP TS 38.215 v16.1.0 as follows:

. . .

When receiving PDSCH scheduled by PDCCH with CRC scrambled by C-RNTI, MCS-C-RNTI, CS-RNTI, or PDSCHs with SPS, the REs corresponding to the configured or dynamically indicated resources in Clauses 5.1.4.1, 5.1.4.2 are not available for PDSCH. Furthermore, the UE assumes SS/PBCH block transmission according to ssb-PositionsInBurst if the PDSCH resource allocation overlaps with PRBs containing SS/PBCH block transmission resources, the UE shall assume that the PRBs containing SS/PBCH block transmission resources are not available for PDSCH in the OFDM symbols where SS/PBCH block is transmitted.

. . .

PDSCH resource mapping with RB symbol level granularity is discussed in Section 5.1.4.1 of 3GPP TS 38.215 v16.1.0 as follows:

. . .

The procedures for PDSCH scheduled by PDCCH with DCI format 1_1 described in this clause equally apply to PDSCH scheduled by PDCCH with DCI format 1_2, by applying the parameters of rateMatchPattern-Group1-ForDCIFormat1_2, rateMatchPatternGroup2-ForDCIFormat1_2 instead of rateMatchPatternGroup1 and rateMatchPatternGroup2.

A UE may be configured with any of the following higher layer parameters indicating REs declared as not available for PDSCH:

rateMatchPatternToAddModList given by PDSCH-Config, by ServingCellConfig or by ServingCell-ConfigCommon and configuring up to 4 RateMatch-Pattern(s) per BWP and up to 4 RateMatchPattern(s) per serving-cell. A RateMatchPattern may contain:

. . .

within a BWP, a frequency domain resource of a CORESET configured by ControlResourceSet with controlResourceSetId or ControlResource-SetZero and time domain resource determined by the higher layer parameters monitoringSlotPeriodicityAndOffset, duration and monitoringSymbolsWithinSlot of all search-space-sets configured by SearchSpace and time domain resource of search-space-set zero configured by searchSpaceZero associated with the CORESET as well as CORESET duration configured by ControlResourceSet with controlResourceSetId or ControlResourceSetZero. This resource not available for PDSCH can be included in one or two groups of resource sets (higher layer parameters rateMatchPatternGroup1 and rateMatchPattern-Group2).

. . .

Overlap of PDSCH (for downlink data) and PUCCH resources (for downlink control information) may result in performance degradation, while orthogonal assignments of PDSCH and PUCCH resources may reduce resource efficiency.

According to some embodiments of inventive concepts, a UE can have up to 8 SPSs and this semi-static resource can be used to allocate DCIs and this allocation mechanism can be more spectrally efficient in comparison to semi-static resources being allocated for both data and DCI separately According to some embodiments of inventive concepts, mechanisms are5 applicable to both licensed and unlicensed operations (such as LAA/eLAA/feLAA/MulteFire, and New Radio NR unlicensed operation (NR-U)). The term SPS is used in the following disclosure. The term SPS may also interchangeably referred to as configured DL assignment, or PDSCH assignment without an associated DCI except the first PDSCH occasion etc. vice versa. The term DL assignment or scheduled DL assignment or dynamic PDSCH mean DL resources dynamically scheduled by the gNB. Embodiments discussed below are not restricted by terms. Any similar term is equally applicable here.

In one embodiment, the DL SPS occasion (for PDSCH) and PDCCH monitoring occasion (for DCI) can overlap fully as shown in FIG. 2 or partially as shown in FIG. 1. During an overlapping occasion, the gNB can transmit either PDSCH or DCI or both PDSCH and DCI. For the case that both DL SPS PDSCH and PDCCH are transmitted on the overlapping resources, one of the DL SPS PDSCH and PDCCH is transmitted on the original configured resource, while the other may be transmitted partially on the remaining resource. FIGS. 1 and 2 illustrate some of the numerous examples, where in FIG. 1, both SPS and DCI are configured with similar periodicity, and in FIG. 2, DCI resources are configured with relative double periodicity compared to DL SPS (i.e., every alternate SPS occasion, there is also a PDCCH monitoring occasion configured for the UE to receive DCI).

In one option, the PDCCH monitoring occasion for DCI transmission can
Partially overlap (see FIG. 1) with DL SPS, or
Fully overlap (see FIG. 2) with DL SPS.
In one option, the PDCCH and DL SPS PDSCH resources can overlap in
1. Time-domain and in frequency domain, or
2. Time-domain but not in frequency domain.
Especially for case 2 above, depending on UE capability (e.g., how many RF chains are configured in the UE), the UE can expect to receive both DCI and PDSCH if parallel receptions are allowed (e.g., if multiple RF chains exist). Unlike case 2, for case 1, either one of them is transmitted on the overlapped time- and frequency-domain resource portion.

In FIG. 1, both SPS and DCI monitoring occasions overlap and are configured with a same periodicity. Each of the DL SPS monitoring occasions occupies one slot, and each of the DCI monitoring occasions occupies a portion of one slot. In FIG. 1, the DL SPS monitoring occasions have a periodicity of 2 slots, the DCI monitoring occasions have a periodicity of 2 slots, and each DCI monitoring occasion overlaps a portion of a respective DL SPS monitoring occasion. As shown, a DCI monitoring occasion may use frequency resources outside frequency resources used by the respective DL SPS resource, and the DL SPS resource may use time resources outside time resources used by the respective DCI monitoring occasion. According to some other embodiments, a DCI monitoring occasion may use time resources outside time resource sued by the respective DL SPS resource, and the DL SPS resource may use frequency resources outside frequency resources used by the respective DCI monitoring occasion.

In FIG. 2, SPS and DCI monitoring occasions are configured with different periodicities but their configured occasions fully overlap. In FIG. 2, each of the DL SPS and DCI monitoring occasions occupies a portion of one slot, the DL SPS monitoring occasions have a periodicity of 2 slots, and the DCI monitoring occasions have a periodicity of 4 slots.

In one embodiment, separate PDCCH and DL SPS resources are configured to a UE (also referred to as assigned to a UE), and if for some occasions, the PDCCH resource overlaps with DL SPS resource, then in these occasions, the UE can expect to receive either DL SPS or DCI transmission or both DL SPS and DCI.

In one version of the above embodiment, a UE first detects PDCCH on the configured PDCCH resource. If PDCCH is detected, the PDCCH resource is considered not available for DL SPS PDSCH and the UE is expected to decode PDSCH assuming that the DL SPS PDSCH resource is rate-matched around the PDCCH resource. Alternatively, if PDCCH is detected, the overlapping time domain resource is considered not available for DL SPS PDSCH, and the UE is expected to decode DL SPS PDSCH assuming that DL SPS PDSCH resource is rate-matched around the unavailable resources (i.e., rate-matched around the time overlapped resources). If PDCCH is not detected, the UE is expected to decode DL SPS PDSCH according to the configured DL SPS PDSCH resource. PDCCH detection can be based on the detection of PDCCH Demodulation Reference Signals DMRS or the check of PDCCH Cyclic Redundancy Checksum CRC bits.

In the above embodiment, the UE does not expect to receive both PDCCH and PDSCH if PDSCH DM-RS Resource Elements REs are overlapping with PDCCH resources, in which case, the UE may skip monitoring PDCCH or alternatively skip decoding PDSCH.

In the above embodiment, transport block size (TBS) of the PDSCH transmission does not change regardless of whether PDCCH is detected. That is, the TBS is determined according to the previously configured DL SPS PDSCH resource. Alternatively, a new TBS determination is performed based on the available resource for PDSCH if PDSCH resource is rate-matched around the overlapping PDCCH resource.

In one embodiment, if a PDCCH resource overlaps with a (DL SPS) PDSCH resource, a UE is configured with relaxed PDCCH monitoring activities relative to what the UE uses to perform PDCCH monitoring in a non-overlapping PDCCH resource.
1. In one option, the number of PDCCH candidates to monitor per monitoring occasion reduces according to certain rule or configuration.
2. In another option, the UE monitors PDCCH candidates according to a separate search space (i.e., a search space used for the occasions which overlap with DL SPS PDSCH) which gives relaxed PDCCH monitoring activities.
3. In another option, the gNB may curtail the occasions for monitoring DCIs. For example, in FIG. 1, the gNB can indicate that the UE is to ignore every third monitoring occasion (correspond to every third cross-section box in FIG. 1).

In another embodiment, if a PDCCH resource overlaps with a (DL SPS) PDSCH resource, a UE is expected to monitor different DCI formats than what it is configured to monitor in the search space. For example, the UE is expected to monitor a subset of DCI formats or a special DCI format in the PDCCH monitoring occasion which overlaps with DL SPS PDSCH, while in other non-overlapping PDCCH monitoring occasions, the UE monitors DCI formats as configured in the search space.

In one embodiment, for a given DCI transmitted in the PDSCH resource, the DCI is allowed to carry at least one of the below indicated information elements:
A scheduled uplink grant
A scheduled downlink assignment
A configured uplink grant
A new SPS DL assignment.
A DCI re-activation command carrying updated for the same SPS DL assignment/PDSCH resource used for this PDSCH transmission
  In one option, the DCI contains information about transmission of feedback for the SPS's PDSCHs, or a change in Modulation and Coding Scheme MCS or increase/decrease in repetitions
    This could be related to past PDSCHs, e.g., gNB demanding feedback of last N PDSCHs in one shot.
    This could be related future PDSCHs where, gNB tells the UE to activate or deactivate feedback for future SPS's PDSCHs, or that the PDSCHs will be transmitted with increased or decreased repetitions.
    This could be related to current PDSCH, e.g., gNB asks the UE to decode this PDSCH with new MCS.
  Allocation of consecutive/next Hybrid Automatic Repeat Request HARQ process
  Additional information related to current PDSCH where DCI notifies, e.g.,
  The MCS is changed for this PDSCH
  The current PDSCH data will be repeated again and the DCI contains the allocation for additional PDSCH data repetitions In one option, the DCI and the data can be encoded together on the PDSCH resource in case the DCI and the PDSCH resources overlap.

In one embodiment, the prioritization or preference techniques can be applied to the cases when data and DCI are encoded together. According to some embodiments, a part of the data or DCI is sacrificed while encoding the two together.

In one embodiment, if dynamic PDSCH is allocated over PDCCH (where PDCCH is allocated earlier with respect to PDSCH), then one or more of the underfollowing options can be considered,
1. If PDSCH and PDCCH belong to same priority, then
   a. PDSCH will be preferred over the overlapping resource,
   b. PDCCH will be preferred over the overlapping resource,
2. If PDSCH and PDCCH belong to different priorities (irrespective of priority),
   a. PDSCH will be preferred over the overlapping resource,
   b. PDCCH will be preferred over the overlapping resource,
3. If PDSCH has low priority and PDCCH has high priority, then
   a. PDCCH will be preferred over the overlapping resource,
4. If PDSCH has high priority and PDCCH has low priority, then
   a. PDSCH will be preferred over the overlapping resource,
5. The later transmission will be preferred (which is PDSCH).

In one embodiment, if PDCCH is allocated over the dynamic PDSCH (where dynamic PDSCH is allocated earlier with respect to PDCCH), then one or more of the underfollowing options can be considered, 1. If PDCCH and PDSCH belong to same priority, then
   a. PDSCH will be preferred over the overlapping resource,
   b. PDCCH will be preferred over the overlapping resource,
2. If PDCCH and PDSCH belong to different priorities (irrespective of priority),
   a. PDCCH will be preferred over the overlapping resource,
   b. PDSCH will be preferred over the overlapping resource,
3. If PDCCH has low priority and PDSCH has high priority, then
   a. PDSCH will be preferred over the overlapping resource,
4. If PDCCH has high priority and PDSCH has low priority, then
   a. PDCCH will be preferred over the overlapping resource,
5. The later transmission will be preferred (which is PDCCH).

In one embodiment, in case PDSCH and DCI are overlapping in time but not in frequency domain, gNB configures the number of Resource Elements REs and positions for each DCI field on PDSCH. The configuration may be adapted according to the MCS assigned to the PDSCH, and the size of the DCI field. The configuration is signaled to the UE via Radio Resource Control RRC signaling or Medium Access Control MAC Control ElementCE.

The network configures the number of Resource Elements REs used for DCI information in a more flexible fashion so that a reduced/minimum number of REs can be provisioned for the data transmission. Other means besides RRC signaling (such as carried by the MAC CE, or L1/L2 control channel, such as PDCCH like channel) may signal such configuration.

The portion of the resources for DCI may be determined considering factors, such as the latency/reliability requirements of the data, the latency/reliability requirements of the DCI.

The DCI information may be allowed to be transmitted partly in the corresponding slot. The remaining information can be skipped or transmitted in the subsequent slot, or even be simultaneously transmitted in other PDSCHs (for example, the UE may receive several PDSCHs at the same time, or subsequently).

In one embodiment, it is possible to configure the relative priority order between the data transmission and the DCI transmission.

In one example, the network can configure which logical channels are not allowed to be multiplexed by the DCI information. In this way, the logical channels with high priority or critical Quality of Service QoS requirements can be transmitted alone without interruption by DCI transmission. For example, Ultra-Reliable Low-Latency Communication URLLC may be prioritized over DCI. URLLC transmission is not interrupted by DCI multiplexing.

In the second example, the network can configure which logical channels are allowed to be multiplexed by the DCI information. The network may send signaling to the UE MAC to indicate that DCI transmission is ok to multiplex with enhanced Mobile Broadband eMBB data. Then, the DCI is either transmitted on PDCCH, if there is no eMBB transmission towards the UE, or on PDSCH, when there is transmission for eMBB towards the UE.

In the third example, the network sends signaling to indicate whether DCI is allowed to multiplex with the data for upcoming Downlink DL transmissions. Such indication may be rather flexible. Then, the UE MAC doesn't need to know what exact logical channels are ok to transmit together with the DCI. The indication may be valid for a certain period. In this way, the network may send a signaling to the UE MAC indicating that the DCI on PDSCH is activated. After a while, the network may send another signaling to deactivate the DCI multiplexing on PDSCH.

In one embodiment, the above embodiments considered for DL SPS, can also be applied for dynamic PDSCH or multi-TTI/HARQ/PDSCH scheduling or side-link shared channel (SLSCH), where multiplexing between DCI and dynamic PDSCH/SLSCH is allowed in a flexible manner. Further, the resource can be a part of licensed and/or unlicensed spectrum.

In one embodiment, for any of the above embodiments, the DCI can have any type of DCI format. The DCI may carry an uplink grant or a DL assignment. The DCI may also carry neither any uplink grant nor any DL assignment.

Operations of the communication device 300 (implemented using the structure of the block diagram of FIG. 3) will now be discussed with reference to the flow chart of FIG. 6 according to some embodiments of inventive concepts. For example, modules may be stored in memory 305 of FIG. 3, and these modules may provide instructions so that when the instructions of a module are executed by respective communication device processing circuitry 303, processing circuitry 303 performs respective operations of the flow chart.

According to some embodiments at operation 6005, processing circuitry 303 monitors PDCCH candidates on the configured PDCCH resources.

According to some embodiments at operation 6015, processing circuitry 303 may, if a PDCCH is successfully decoded for the configured PDCCH resources, decode PDSCH on the resources configured for SPS PDSCH, wherein the PDSCH is rate-matched around the PDCCH resource corresponding to the PDCCH decoding. Further, if instead a PDCCH is not successfully decoded for the configured PDCCH resources, processing circuitry 303 may decoding PDSCH on the resources configured for SPS PDSCH.

According to some embodiments, the PDCCH detection is based on the detection of PDCCH DMRS or the check of PDCCH cyclic redundancy check, CRC, bits.

According to some embodiments, if PDSCH DM-RS resource elements overlaps with resources configured for monitoring PDCCH candidates may skip monitoring PDCCH candidates on the configured resources, then the communication device may skip monitoring PDCCH candidates on the configured resources and/or it may skip decoding PDSCH on the resources configured for SPS. In further embodiments, the transport block size, TBS, is determined based on the resources configured for SPS of PDSCH. Alternatively, the TBS is determined based on the resources configured for SPS of PDSCH, where the PDSCH is rate-matched around downlink control information, DCI, resources obtained from the PDCCH decoding. In some further embodiments, the number of PDCCH candidates to monitor per monitoring occasion is reduces according to a rule or a configuration. In some embodiments the communication device is configured to monitor number of PDCCH candidates with a given DCI format such as a subset of DCI format or a special DCI format.

Operations of the communication device 300 (implemented using the structure of the block diagram of FIG. 3) will now be discussed with reference to the flow chart of FIG. 7 according to some embodiments of inventive concepts. For example, modules may be stored in memory 305 of FIG. 3, and these modules may provide instructions so that when the instructions of a module are executed by respective communication device processing circuitry 303, processing circuitry 303 performs respective operations of the flow chart.

According to some embodiments at operation 7005, processing circuitry 303 determines that a downlink control information DCI resource for the communication device and a downlink data resource for the communication device overlap.

According to some embodiments at operation 7009, processing circuitry 303 detects reference signals (e.g., demodulation reference signals DMRS) from a portion of the downlink data resource that overlaps with the DCI resource;

According to some embodiments at operation 7015, processing circuitry 303 skips monitoring and/or decoding of the DCI resource responsive to detecting reference signals from the portion of the downlink data resource that overlaps with the DCI resource.

According to some embodiments at operation 7019, processing circuitry 303 decodes the downlink data resource that overlaps with the DCI resource responsive to detecting the reference signals.

Various operations from the flow chart of FIG. 7 may be optional with respect to some embodiments of communication devices and related methods. Regarding methods of example embodiment 1 (set forth below), for example, operations of blocks 7009 and/or 7019 of FIG. 7 may be optional.

Operations of the communication device 300 (implemented using the structure of the block diagram of FIG. 3) will now be discussed with reference to the flow chart of FIG. 8 according to some embodiments of inventive concepts. For example, modules may be stored in memory 305 of FIG. 3, and these modules may provide instructions so that when the instructions of a module are executed by respective communication device processing circuitry 303, processing circuitry 303 performs respective operations of the flow chart.

According to some embodiments at operation 8005, processing circuitry 303 determines that a downlink control information DCI resource for the communication device and a downlink data resource for the communication device overlap.

According to some embodiments at operation 8009, processing circuitry 303 detects reference signals (e.g., demodulation reference signals DMRS) from a portion of the downlink data resource that overlap with the DCI resource.

According to some embodiments at operation 8015, processing circuitry 303 skips monitoring and/or decoding of the downlink data resource responsive to detecting reference signals from the portion of the downlink data resource that overlaps with the DCI resource.

According to some embodiments at operation 8019, processing circuitry 303 decodes DCI from the DCI resource responsive to detecting the reference signals.

Various operations from the flow chart of FIG. 8 may be optional with respect to some embodiments of communication devices and related methods. Regarding methods of example embodiment 1 (set forth below), for example, operations of blocks 8009 and/or 8019 of FIG. 8 may be optional.

According to some embodiments of any of FIGS. 6, 7, and/or 8, the DCI resource overlaps with the downlink data resource in a time domain without overlapping in a frequency domain, or the DCI resource overlaps with the downlink data resource in a time domain and in a frequency domain.

According to some embodiments of any of FIGS. 6, and/or 8, the DCI resource is one of a plurality of periodic DCI resources, and/or the downlink data resource is one of a plurality of periodic downlink data resources (e.g., one of a plurality of semi-persistent scheduling SPS periodic downlink data resources).

According to some embodiments of any of FIGS. 6, 7, and/or 8, the downlink data resource is a dynamically scheduled downlink data resource.

According to some embodiments of any of FIGS. 6, 7, and/or 8, the DCI resource is provided using a physical downlink control channel PDCCH and/or the downlink data resource is provided using a physical downlink shared channel PDSCH.

Operations of the communication device 300 (implemented using the structure of the block diagram of FIG. 3) will now be discussed with reference to the flow chart of FIG. 9 according to some embodiments of inventive concepts. For example, modules may be stored in memory 305 of FIG. 3, and these modules may provide instructions so that when the instructions of a module are executed by respective communication device processing circuitry 303, processing circuitry 303 performs respective operations of the flow chart.

According to some embodiments at operation 9005, processing circuitry 303 may receive (through transceiver 301) information over a downlink data resource, and the information includes downlink control information DCI and downlink data that are encoded together.

According to some embodiments at operation 9009, processing circuitry 303 decodes the information received over the downlink data resource to provide the DCI and the downlink data. Processing circuitry 303 may decode the information including the DCI and the downlink data using a same cyclic redundancy checksum CRC.

According to some embodiments, the downlink data resource may be a physical downlink shared channel PDSCH resource. The PDSCH resource may be one of a plurality of periodic PDSCH resources (e.g., one of a plurality of semi-persistent scheduling periodic PDSCH resources), or the PDSCH resource may be a dynamically allocated PDSCH resource.

Figure 9:
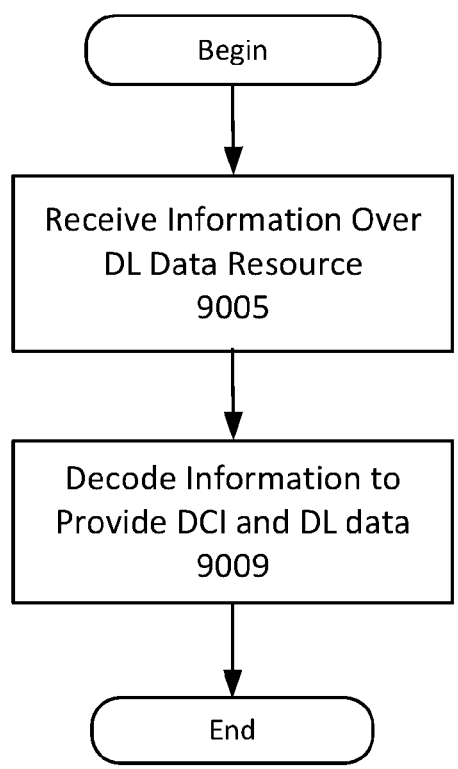

Various operations from the flow chart of FIG. 9 may be optional with respect to some embodiments of communication devices and related methods.

Figure 10:
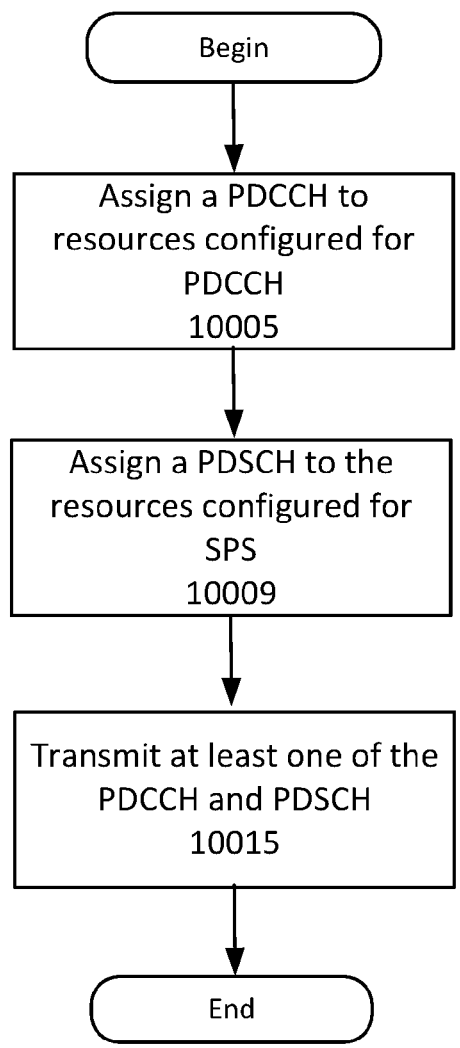
FIGS. 10, 11 and 12 are flow charts illustrating operations of RAN nodes according to some embodiments of inventive concepts.

Operations of a RAN node 400 (implemented using the structure of FIG. 4) will now be discussed with reference to the flow charts of FIG. 10 according to some embodiments of inventive concepts. For example, modules may be stored in memory 405 of FIG. 4, and these modules may provide instructions so that when the instructions of a module are executed by respective RAN node processing circuitry 403, processing circuitry 403 performs respective operations of the flow chart.

According to some embodiments at operation 10005, processing circuitry 403 assigns a PDCCH to resources configured for PDCCH.

According to some embodiments at operation 10009, processing circuitry 403 assigns a PDSCH to the resources configured for SPS, wherein the PDSCH is rate-matched the PDCCH resource for the communication device, wherein the PDCCH resource and PDSCH resource overlap.

According to some embodiments at operation 10015, processing circuitry 403 transmits (through transceiver 401 at least one of the PDCCH and PDSCH.

According to some embodiments, the PDSCH DM-RS are assigned resource elements that overlaps with resources configured for monitoring PDCCH candidates. In another embodiment the TBS is determined based on the resources configured for SPS of PDSCH. Alternatively, TBS, is determined based on the resources configured for SPS of PDSCH, wherein the PDSCH is rate-matched around downlink control information, DCI, resources obtained from the PDCCH decoding. In some embodiments a given DCI format such as a subset of DCI format or a special DCI format is used for the resources for monitoring PDCCH candidates, wherein the resources at least in part overlaps with resources configured for SPS of PDSCHOperations of a RAN node 400 (implemented using the structure of FIG. 4) will now be discussed with reference to the flow chart of FIG. 11 according to some embodiments of inventive concepts. For example, modules may be stored in memory 405 of FIG. 4, and these modules may provide instructions so that when the instructions of a module are executed by respective RAN node processing circuitry 403, processing circuitry 403 performs respective operations of the flow chart.

According to some embodiments at operation 11005, processing circuitry 403 receives (e.g., from higher protocol layers and/or from an application server) data for the communication device. According to some embodiments at operation 11009, processing circuitry 403 generates downlink control information DCI for the communication device, with the DCI being prioritized relative to the downlink data.

According to some embodiments at operation 11015, processing circuitry 403 selects a first portion of the data for the communication device as downlink data.

According to some embodiments at operation 11025, processing circuitry 403 sacrifices a second portion of the data for the communication device responsive to the DCI being prioritized relative to the downlink data.

According to some embodiments at operation 11029, processing circuitry 403 combines downlink control information DCI and the downlink data to provide information including the DCI and the downlink data for downlink transmission to a communication device. Accordingly, the downlink data includes the first portions of the data that was selected without including the second portion of the data that was sacrificed. According to some embodiments, processing circuitry 403 combines the DCI and downlink data by encoding the DCI and the downlink data to provide the information including the DCI and the downlink data. For example, encoding may include generating a cyclic redundancy checksum CRC that is used for the information including both the DCI and the downlink data.

According to some embodiments at operation 11035, processing circuitry 403 transmits (through transceiver 401) the information including the DCI and the downlink data over a downlink data resource to the communication device. Accordingly, the first portions of the data that were selected are transmitted without transmitting the second portions of the data that was sacrificed. While the second portion of the data is sacrificed with respect to the present downlink data resource, the second portion of the data may be transmitted, for example, using one or more other downlink data resource(s).

Figure 11:
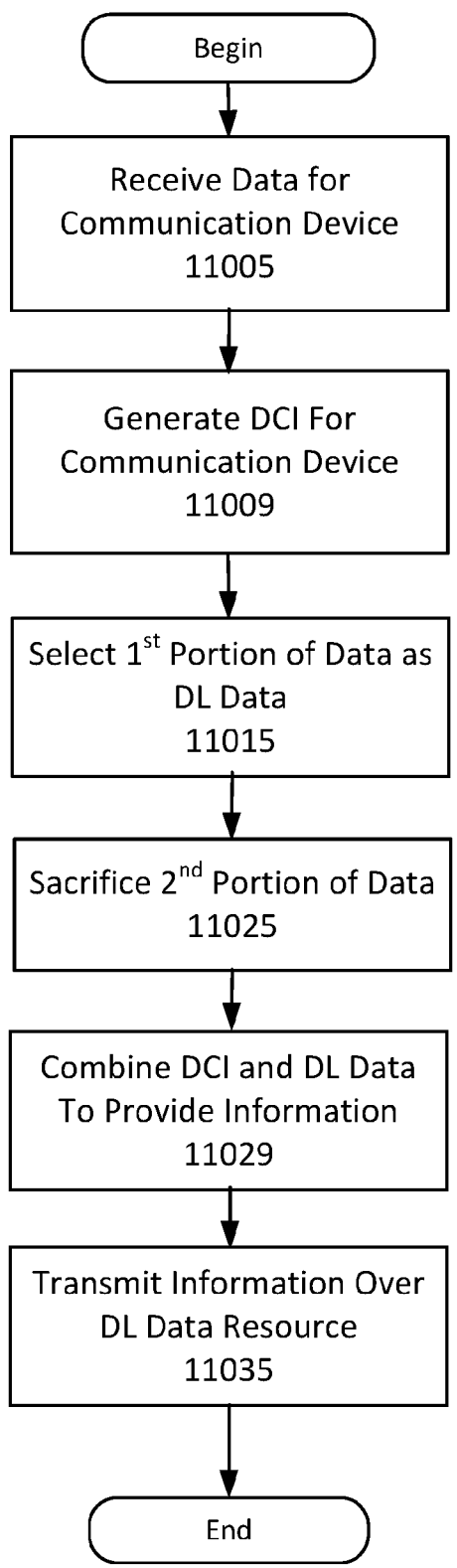

According to some embodiments of FIG. 11, the downlink data resource comprises a physical downlink shared channel PDSCH resource assigned to the communication device. For example, the PDSCH resource may be one of a plurality of periodic PDSCH resources assigned to the communication device (e.g., a plurality of semi-persistent scheduling periodic PDSCH resources), or the PDSCH resource may be a dynamically allocated PDSCH resource.

Various operations from the flow chart of FIG. 11 may be optional with respect to some embodiments of RAN nodes and related methods. Regarding methods of example embodiment 49 (set forth below), for example, operations of blocks 11005, 11009, 11015, and/or 11025 of FIG. 11 may be optional.

Operations of a RAN node 400 (implemented using the structure of FIG. 4) will now be discussed with reference to the flow chart of FIG. 12 according to some embodiments of inventive concepts. For example, modules may be stored in memory 405 of FIG. 4, and these modules may provide instructions so that when the instructions of a module are executed by respective RAN node processing circuitry 403, processing circuitry 403 performs respective operations of the flow chart.

According to some embodiments at operation 12005, processing circuitry receives (e.g., from higher protocol layers and/or from an application server) data for the communication device. According to some embodiments at operation 12009, processing circuitry 403 generates control information for the communication device, with the downlink data being prioritized relative to the control information.

According to some embodiments at operation 12015, processing circuitry 403 selects a first portion of the control information for the communication device as downlink control information DCI.

According to some embodiments at operation 12025, processing circuitry 403 sacrifices a second portion of the control information for the communication device responsive to the downlink data being prioritized relative to the control information and/or DCI.

According to some embodiments at operation 12029, processing circuitry 403 combines the DCI and downlink data to provide information including the DCI and the downlink data for downlink transmission to a communication device. Accordingly, the DCI includes the first portion of the control information that was selected without including the second portion of the control information that was sacrificed. According to some embodiments, processing circuitry 403 combines the DCI and downlink data by encoding the DCI and the downlink data to provide the information including the DCI and the downlink data. For example, encoding may include generating a cyclic redundancy checksum CRC that is used for the information including both the DCI and the downlink data.

According to some embodiments at operation 12035, processing circuitry 403 transmits (through transceiver 401) the information including the DCI and the downlink data over a downlink data resource to the communication device. Accordingly, the first portions of the control information that were selected are transmitted as DCI without transmitting the second portions of the control information that was sacrificed. While the second portion of the DCI is sacrificed with respect to the present downlink data resource, the second portion of the DCI may be transmitted, for example, using one or more other downlink data resource(s).

Figure 12:
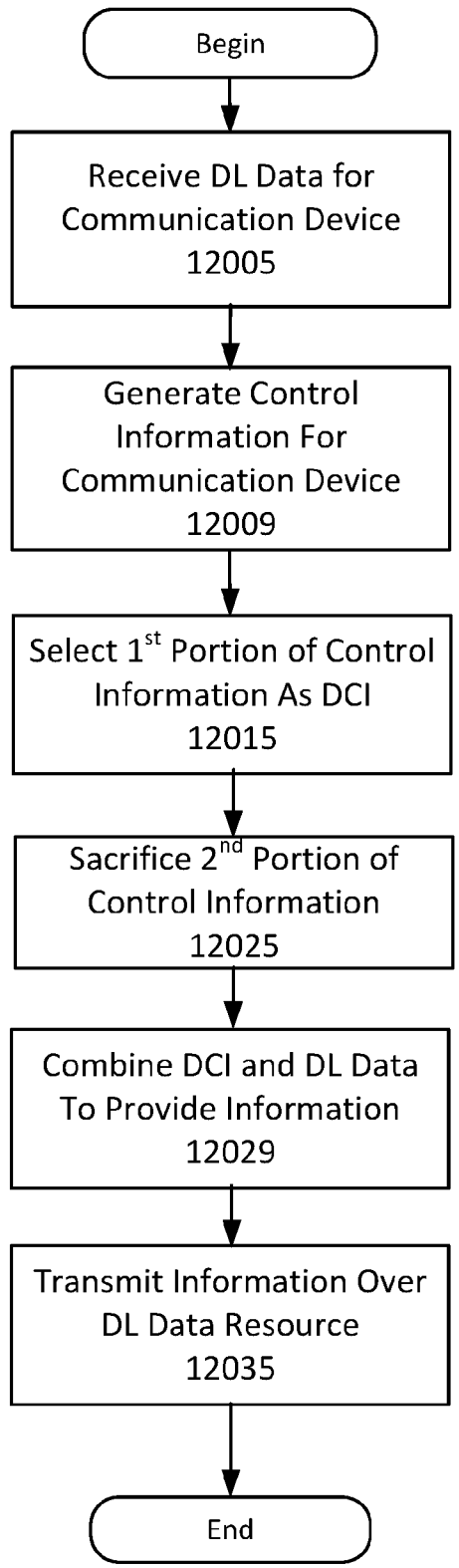

According to some embodiments of FIG. 12, the downlink data resource comprises a physical downlink shared channel PDSCH resource assigned to the communication device. For example, the PDSCH resource may be one of a plurality of periodic PDSCH resources assigned to the communication device (e.g., a plurality of semi-persistent scheduling periodic PDSCH resources), or the PDSCH resource may be a dynamically allocated PDSCH resource.

Various operations from the flow chart of FIG. 12 may be optional with respect to some embodiments of RAN nodes and related methods. Regarding methods of example embodiment 49 (set forth below), for example, operations of blocks 12005, 12009, 12015, and/or 12025 of FIG. 12 may be optional.

Example embodiments are discussed below.

1. A method of operating a communication device in a communication network, the method comprising:
   determining (6005, 7005, 8005) that a downlink control information, DCI, resource and a downlink data resource overlap; and
   skipping (6015, 7015, 8015) monitoring and/or decoding portions of at least one of the downlink data resource and/or the DCI resource based on the DCI resource and the downlink data resource overlapping.

2. The method of claim 1 further comprising:
   detecting (6009) DCI on the DCI resource that overlaps with the downlink data resource;
   wherein skipping monitoring and/or decoding comprises skipping monitoring and/or decoding a portion of the downlink data resource that overlaps with the DCI resource responsive to detecting the DCI on the DCI resource.

3. The method of Embodiment 2, wherein the portion comprises a first portion of the downlink data resource that overlaps with the DCI resource, wherein a second portion of the downlink data resource does not overlap with the DCI resource, and wherein skipping monitoring and/or decoding comprises skipping (6015a) monitoring and/or decoding the first and second portions of the downlink data resource.

4. The method of Embodiment 2, wherein the portion comprises a first portion of the downlink data resource that overlaps with the DCI resource, and wherein a second portion of the downlink data resource does not overlap with the DCI resource, wherein skipping monitoring and/or decoding comprises skipping (6015b-1) monitoring and/or decoding the first portion of the downlink data resource, the method further comprising:
   decoding (6015b-2) the second portion of the downlink data resource that does not overlap with the DCI resource.

5. The method of any of Embodiments 3-4, wherein the first portion of the downlink data resource overlaps with the DCI resource in a time domain, and wherein the second portion of the downlink data resource does not overlap with the DCI resource in the time domain.

6. The method of Embodiment 5, wherein the first portion of the downlink data resource overlaps with the DCI resource in a frequency domain.

7. The method of Embodiment 2, wherein an entirety of the downlink data resource overlaps with the DCI resource in a time domain, and wherein skipping monitoring and/or decoding comprises skipping monitoring and/or decoding the entirety of the downlink data resource.

8. The method of Embodiment 7, wherein the entirety of the downlink data resource overlaps with the DCI resource in a frequency domain.

9. The method of any of Embodiments 2-8 further comprising:
   responsive to detecting DCI on the DCI resource that overlaps with the downlink data resource, decoding (6019) the DCI on the DCI resource.

10. The method of Embodiment 9, wherein the DCI is detected on the DCI resource that overlaps with the downlink data resource based on at least one of detecting a demodulation reference signal, DMRS, of the DCI resource and/or checking cyclic redundancy checksum, CRC, bits of the DCI resource.

11. The method of any of Embodiments 9-10, wherein detecting the DCI comprises detecting the DCI based on blind decoding using the at least one of the DMRS of the DCI resource and/or the CRC bits of the DCI resource.

12. The method of any of Embodiments 2-11, wherein the DCI comprises at least one of a scheduled uplink grant, a scheduled downlink assignment, a configured uplink grant, a semi-persistent scheduling, SPS, downlink assignment, and/or a re-activation command of the SPS downlink assignment associated with the downlink data resource.

13. The method of Embodiment 12, wherein the DCI comprises the re-activation command of the SPS downlink assignment associated with the downlink data resource, wherein the re-activation command comprises at least one of feedback information for the downlink data resource, modulation information for the downlink data resource, coding information for the downlink data resource, repetition information for the downlink data resource, hybrid automatic repeat request information for the downlink data resource, and/or an allocation for a data repetition for the downlink data resource.

14. The method of Embodiment 1 further comprising:
   detecting (7009) reference signals from a portion of the downlink data resource that overlaps with the DCI resource;
   wherein skipping comprises skipping (7015) monitoring and/or decoding of the DCI resource responsive to detecting reference signals from the portion of the downlink data resource that overlaps with the DCI resource.

15. The method of Embodiment 14 further comprising:
   decoding (7019) the downlink data resource that overlaps with the DCI resource responsive to detecting the reference signals.

16. The method of Embodiment 1 further comprising:
   detecting (8009) reference signals from a portion of the downlink data resource that overlaps with the DCI resource;
   wherein skipping comprises skipping (8015) monitoring and/or decoding of the downlink data resource responsive to detecting reference signals from the portion of the downlink data resource that overlaps with the DCI resource.

17. The method of Embodiment 16 further comprising:
   decoding (8019) DCI from the DCI resource responsive to detecting the reference signals.

18. The method of any of Embodiments 1-17, wherein the DCI resource overlaps with the downlink data resource in a time domain without overlapping in a frequency domain.

19. The method of any of Embodiments 1-17, wherein the DCI resource overlaps with the downlink data resource in a time domain and in a frequency domain.
20. The method of any of Embodiments 1-19, wherein the DCI resource comprises one of a plurality of periodic DCI resources.
21. The method of any of Embodiments 1-20, wherein the downlink data resource comprises one of a plurality of periodic downlink data resources.
22. The method of Embodiment 21, wherein the plurality of periodic downlink data resources comprise a plurality of semi-persistent scheduling, SPS, periodic downlink data resources.
23. The method of any of Embodiments 1-20, wherein the downlink data resource comprises a dynamically scheduled downlink data resource.
24. The method of any of Embodiments 1-23, wherein the DCI resource is provided using a physical downlink control channel, PDCCH, and/or wherein the downlink data resource is provided using a physical downlink shared channel, PDSCH.
25. The method of any of Embodiments 1-24, wherein the DCI resource and the downlink data resource are intended for the communication device.
26. A method of operating a communication device in a communication network, the method comprising:
receiving (9005) information over a downlink data resource, wherein the information includes downlink control information, DCI, and downlink data that are encoded together; and
decoding (9009) the information received over the downlink data resource to provide the DCI and the downlink data.
27. The method of Embodiment 26, wherein decoding the information comprises decoding the information including the DCI and the downlink data using a same cyclic redundancy checksum, CRC.
28. The method of any of Embodiments 26-27, wherein the downlink data resource comprises a physical downlink shared channel, PDSCH, resource.
29. The method of Embodiment 28, wherein the PDSCH resource comprises one of a plurality of periodic PDSCH resources.
30. The method of Embodiment 29, wherein the plurality of periodic PDSCH resources comprise a plurality of semi-persistent scheduling periodic PDSCH resources.
31. The method of Embodiment 29, wherein the PDSCH resource comprises a dynamically allocated PDSCH resource.
32. A method of operating a radio access network, RAN, node in a communication network, the method comprising:
assigning (10005) a downlink control information, DCI, resource for a communication device;
assigning (10009) a downlink data resource for the communication device, wherein the DCI resource and the downlink data resource overlap; and
transmitting (10015, 10015a, 10015b, 10015c) at least one of DCI to the communication device using the DCI resource and/or downlink data to the communication device using the downlink data resource.
33. The method of Embodiment 32, wherein transmitting comprises transmitting (10015a) DCI to the communication device using the DCI resource without transmitting downlink data using a portion of the downlink data resource that overlaps with the DCI resource.
34. The method of Embodiment 33, wherein the portion comprises a first portion of the downlink data resource that overlaps with the DCI resource, wherein a second portion of the downlink data resource does not overlap with the DCI resource, and wherein transmitting comprises transmitting the DCI to the communication device using the DCI resource without transmitting downlink data using the first portion of the downlink data resource and without transmitting downlink data using the second portion of the downlink data resource.
35. The method of Embodiment 33, wherein the portion comprises a first portion of the downlink data resource overlaps with the DCI resource, and wherein a second portion of the downlink data resource does not overlap with the DCI resource, wherein transmitting comprises transmitting the DCI to the communication device using the DCI resource and transmitting downlink data to the communication data to the communication device using the second portion of the downlink data resource without transmitting downlink data using the first portion of the downlink data resource.
36. The method of any of Embodiments 34-35, wherein the first portion of the downlink data resource overlaps with the DCI resource in a time domain, and wherein the second portion of the downlink data resource does not overlap with the DCI resource in the time domain.
37. The method of Embodiment 36, wherein the first portion of the downlink data resource overlaps with the DCI resource in a frequency domain.
38. The method of Embodiment 33, wherein an entirety of the downlink data resource overlaps with the DCI resource in a time domain, and wherein transmitting comprises transmitting the DCI to the communication device using the DCI resource without transmitting downlink data using the downlink data resource.
39. The method of Embodiment 38, wherein the entirety of the downlink data resource overlaps with the DCI resource in a frequency domain.
40. The method of any of Embodiments 33-39, wherein the DCI comprises at least one of a scheduled uplink grant for the communication device, a scheduled downlink assignment for the communication device, a configured uplink grant for the communication device, a semi-persistent scheduling, SPS, downlink assignment for the communication device, and/or a re-activation command of the SPS downlink assignment associated with the downlink data resource for the communication device.
41. The method of Embodiment 40, wherein the DCI comprises the re-activation command of the SPS downlink assignment associated with the downlink data resource for the communication device, wherein the re-activation command comprises at least one of feedback information for the downlink data resource for the communication device, modulation information for the downlink data resource for the communication device, coding information for the downlink data resource for the communication device, repetition information for the downlink data resource for the communication device, hybrid automatic repeat request information for the downlink data resource for the communication device, and/or an allocation for a data repetition for the downlink data resource for the communication device.
42. The method of Embodiment 32, wherein transmitting comprises transmitting (10015b) downlink data to the communication device using the downlink data resource without transmitting DCI using the DCI resource.
43. The method of Embodiment 32, wherein transmitting comprises transmitting (10015*c*) a reference signal in a portion of the downlink data resource that overlaps with the DCI resource and transmitting DCI using the DCI resource.
44. The method of any of Embodiments 32-43, wherein the DCI resource overlaps with the downlink data resource in a time domain without overlapping in a frequency domain.
45. The method of any of Embodiments 32-43, wherein the DCI resource overlaps with the downlink data resource in a time domain and in a frequency domain.
46. The method of any of Embodiments 32-45, wherein the DCI resource comprises one of a plurality of periodic DCI resources assigned to the communication device.
47. The method of any of Embodiments 32-46, wherein the downlink data resource comprises one of a plurality of periodic downlink data resources assigned to the communication device.
48. The method of Embodiment 47, wherein the plurality of periodic downlink data resources comprise a plurality of semi-persistent scheduling, SPS, periodic downlink data resources assigned to the communication device.
49. The method of any of Embodiments 32-46, wherein the downlink data resource comprises a dynamically scheduled downlink data resource assigned to the communication device.
50. The method of any of Embodiments 32-49, wherein the DCI resource is provided using a physical downlink control channel, PDCCH, and/or wherein the downlink data resource is provided using a physical downlink shared channel, PDSCH.
51. A method of operating a radio access network, RAN, node, the method comprising: combining (11029, 12029) downlink control information, DCI, and downlink data to provide information including the DCI and the downlink data for downlink transmission to a communication device; and transmitting (11035, 12035) the information including the DCI and the downlink data over a downlink data resource to the communication device.
52. The method of Embodiment 51, wherein the combining comprises encoding the DCI and the downlink data to provide the information including the DCI and the downlink data.
53. The method of Embodiment 52, wherein encoding comprises generating a cyclic redundancy checksum, CRC, that is used for the information including both the DCI and the downlink data.
54. The method of any of Embodiments 51-53, wherein the DCI is prioritized relative to the downlink data, the method further comprising:
receiving (11005) data for the communication device;
selecting (11015) a first portion of the data for the communication device as the downlink data; and sacrificing (11025) a second portion of the data for the communication device responsive to the DCI being prioritized relative to the downlink data.
55. The method of any of Embodiments 51-53, wherein the downlink data is prioritized relative to the DCI, the method further comprising:

generating (12009) control information for the communication device;
selecting (12015) a first portion of the control information for the communication device as the DCI; and
sacrificing (12025) a second portion of the control information for the communication device responsive to the downlink data being prioritized relative to the DCI.
56. The method of any of Embodiments 51-55, wherein the downlink data resource comprises a physical downlink shared channel, PDSCH, resource assigned to the communication device.
57. The method of Embodiment 56, wherein the PDSCH resource comprises one of a plurality of periodic PDSCH resources assigned to the communication device.
58. The method of Embodiment 57, wherein the plurality of periodic PDSCH resources comprise a plurality of semi-persistent scheduling periodic PDSCH resources.
59. The method of Embodiment 56, wherein the PDSCH resource comprises a dynamically allocated PDSCH resource.
60. A communication device (300) comprising:
processing circuitry (303); and
memory (305) coupled with the processing circuitry, wherein the memory includes instructions that when executed by the processing circuitry causes the communication device to perform operations according to any of Embodiments 1-31.
61. A communication device (300) adapted to perform according to any of Embodiments 1-31.
62. A computer program comprising program code to be executed by processing circuitry (303) of a communication device (300), whereby execution of the program code causes the communication device (300) to perform operations according to any of embodiments 1-31.
63. A computer program product comprising a non-transitory storage medium including program code to be executed by processing circuitry (303) of a communication device (300), whereby execution of the program code causes the communication device (300) to perform operations according to any of embodiments 1-31.
64. A radio access network, RAN, node (400) comprising:
processing circuitry (403); and
memory (405) coupled with the processing circuitry, wherein the memory includes instructions that when executed by the processing circuitry causes the RAN node to perform operations according to any of Embodiments 32-59.
65. A radio access network, RAN, node (400) adapted to perform according to any of Embodiments 32-59.
66. A computer program comprising program code to be executed by processing circuitry (403) of a radio access network, RAN, node (400), whereby execution of the program code causes the RAN node (400) to perform operations according to any of embodiments 32-59.
67. A computer program product comprising a non-transitory storage medium including program code to be executed by processing circuitry (403) of a radio access network, RAN, node (400), whereby execution of the program code causes the RAN node (400) to perform operations according to any of embodiments 32-59.

Explanations are provided below for various abbreviations/acronyms used in the present disclosure.

| Abbreviation | Explanation |
| --- | --- |
| PUSCH | Physical uplink shared channel |
| DCI | Downlink Control Information |
| BWP | Bandwidth Part |
| CE | Control Element |
| CG | Configured Grant |
| CORSET | Control Resource Set |
| CRC | Cyclic Redundancy Checksum |
| DMRS | Demodulation Reference Signal |
| eMBB | enhanced Mobile Broadband |
| UL | Uplink |
| DL | Downlink |
| C-RNTI | Cell Radio-Network Temporary Identifier |
| CS-RNTI | Configured Scheduling Radio-Network Temporary Identifier |
| HARQ | Hybrid Automatic Repeat Request |
| IE | Information Element |
| MAC | Medium Access Control |
| MCS | Modulation and Coding Scheme |
| NR | New Radio |
| RRC | Radio Resource Control |
| SPS | Semi-Persistent Scheduling |
| PDSCH | Physical Downlink Shared Channel |
| PDCCH | Physical Downlink Control Channel |
| QOS | Quality of Service |
| RE | Resource Element |
| SLSCH | Sidelink Shared Channel |
| TTI | Transmission Time Interval |
| UCI | Uplink Control Information |
| URLLC | Ultra-Reliable Low-Latency Communication |

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 13:
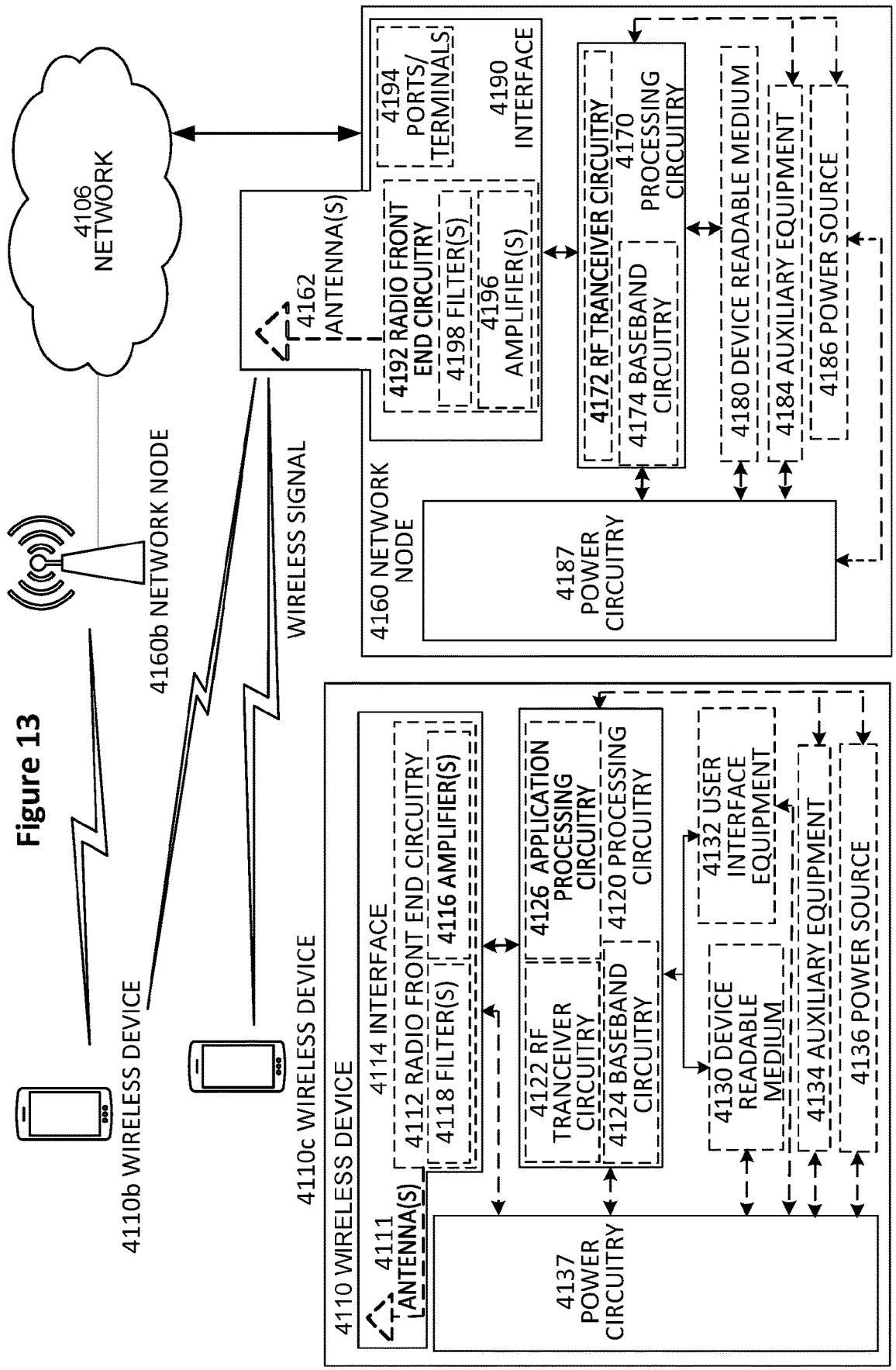
FIG. 13 is a block diagram of a wireless network in accordance with some embodiments.

FIG. 13 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 13 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 14:
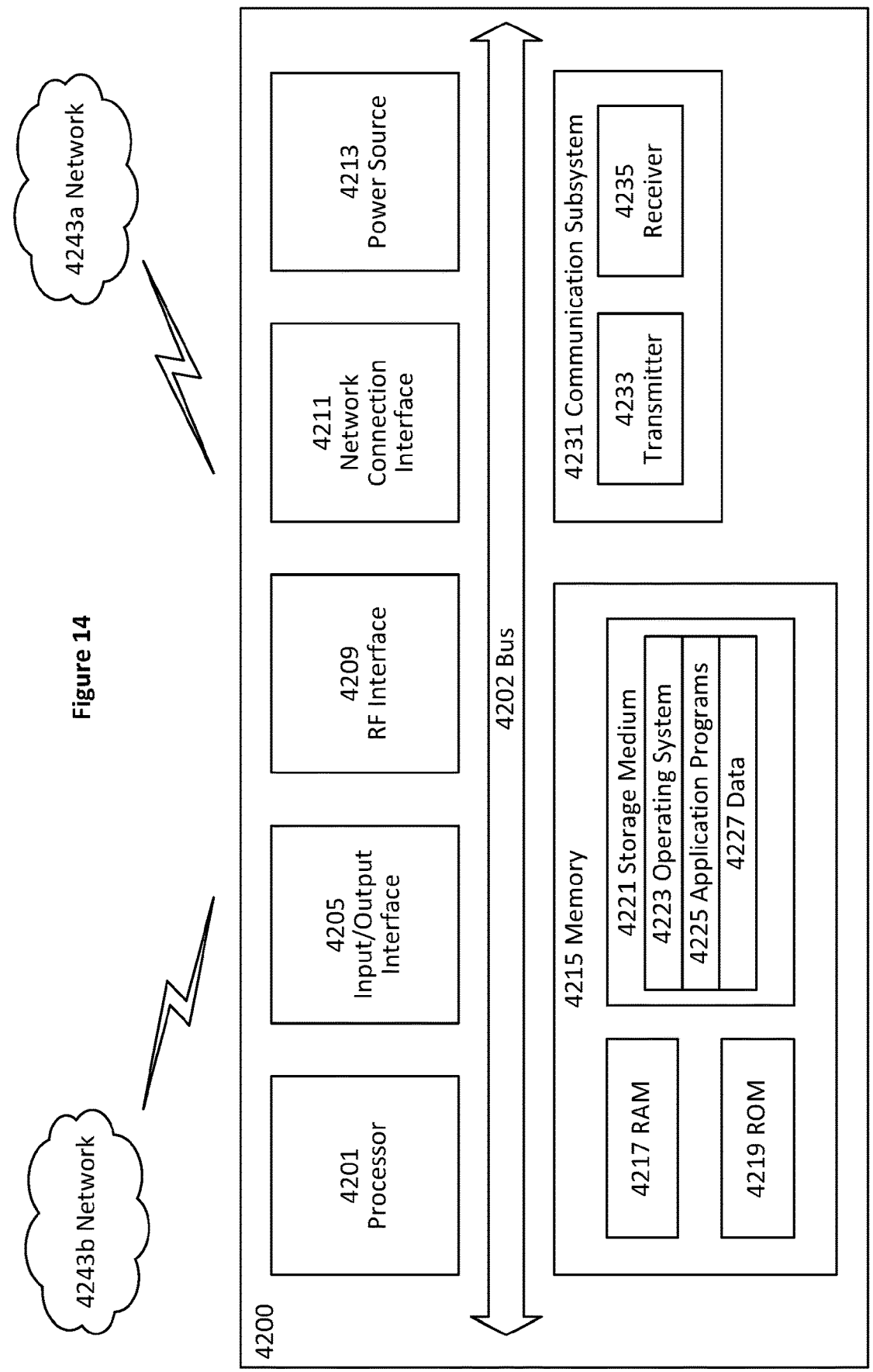
FIG. 14 is a block diagram of a user equipment in accordance with some embodiments

FIG. 14 illustrates a user Equipment in accordance with some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 14, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 14, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 15:
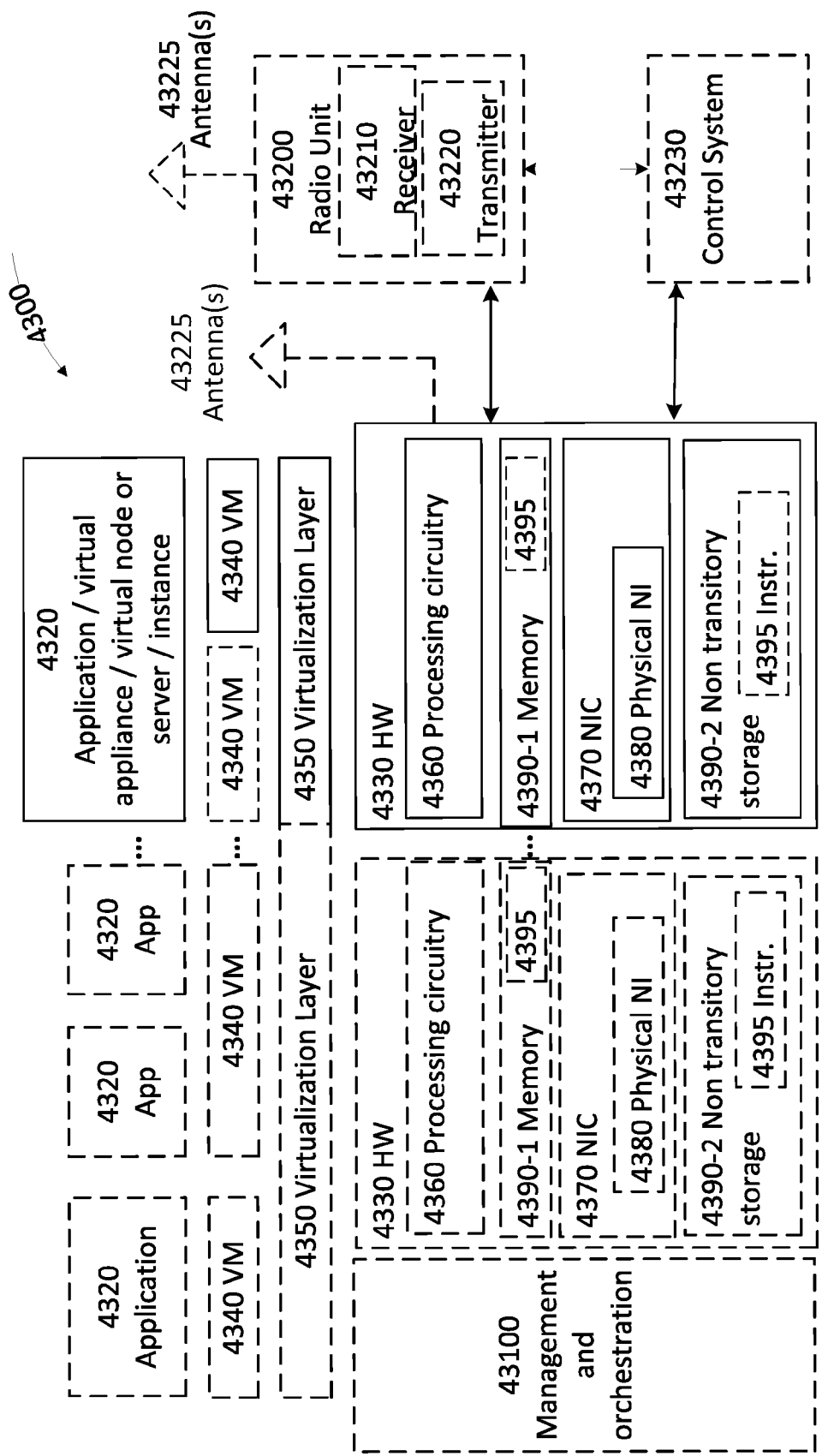
FIG. 15 is a block diagram of a virtualization environment in accordance with some embodiments.

FIG. 15 illustrates a virtualization environment in accordance with some embodiments.

FIG. 15 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 15, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 15.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 16:
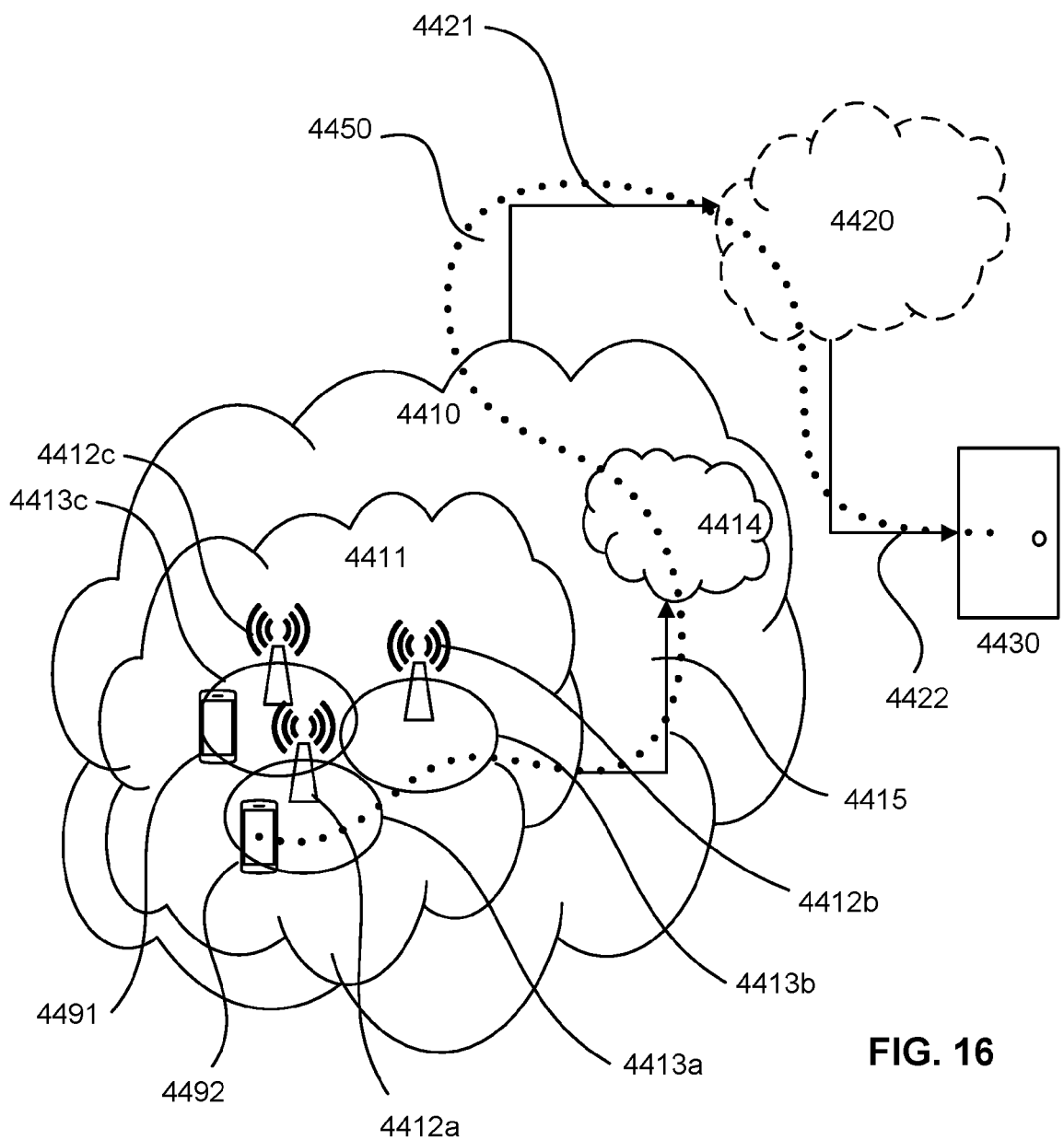
FIG. 16 is a block diagram of a telecommunication network connected via an intermediate network to a host computer in accordance with some embodiments.

FIG. 16 illustrates a telecommunication network connected via an intermediate network to a host computer in accordance with some embodiments.

With reference to FIG. 16, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 16 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 17:
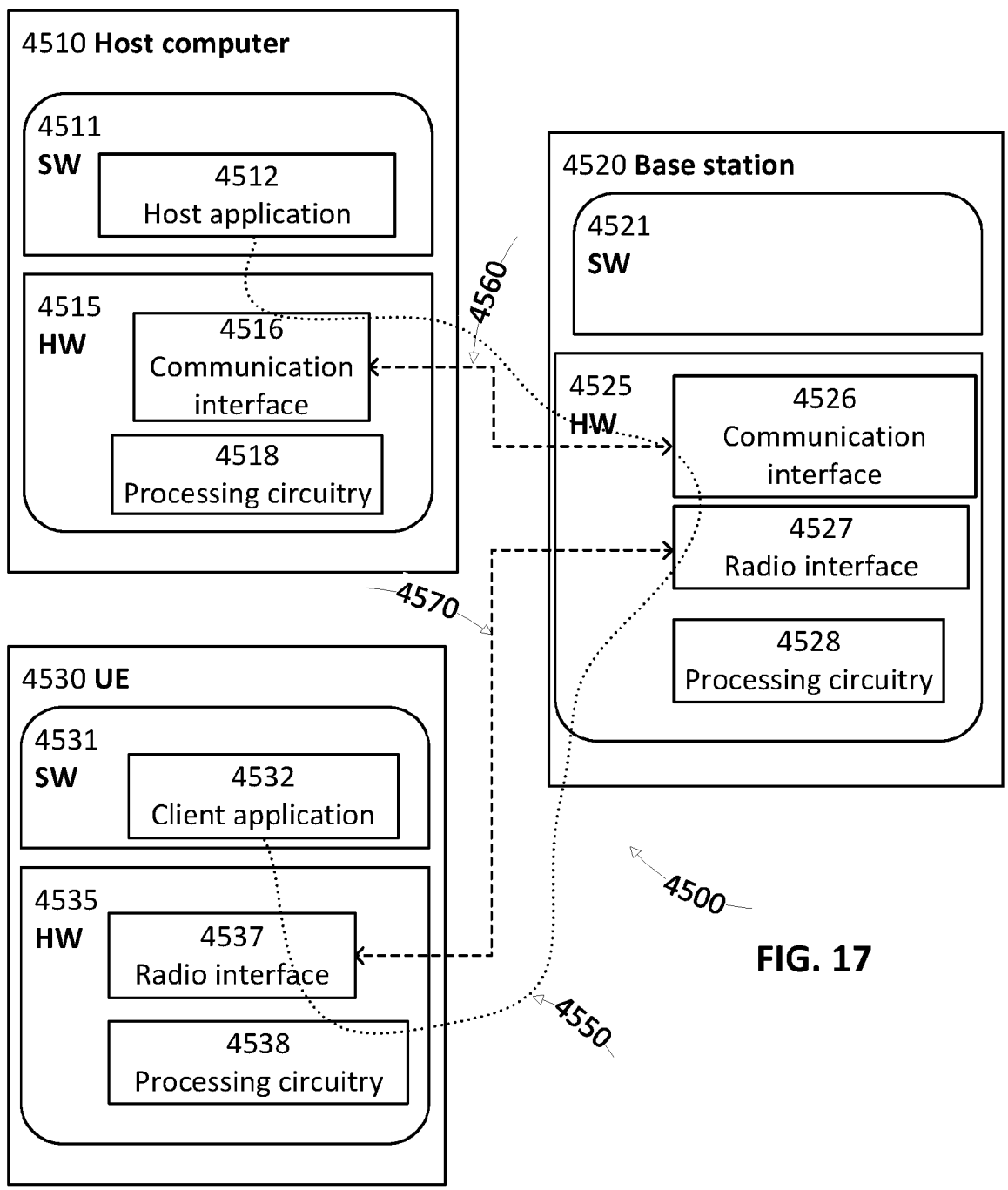
FIG. 17 is a block diagram of a host computer communicating via a base station with a user equipment over a partially wireless connection in accordance with some embodiments.

FIG. 17 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 17. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 17) served by base station 4520. Communication interface 4526 may be configured to facilitate connection 4560 to host computer 4510. Connection 4560 may be direct or it may pass through a core network (not shown in FIG. 17) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 17 may be similar or identical to host computer 4430, one of base stations 4412a, 4412b, 4412c and one of UEs 4491, 4492 of FIG. 16, respectively. This is to say, the inner workings of these entities may be as shown in FIG. 17 and independently, the surrounding network topology may be that of FIG. 16.

In FIG. 17, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 18:
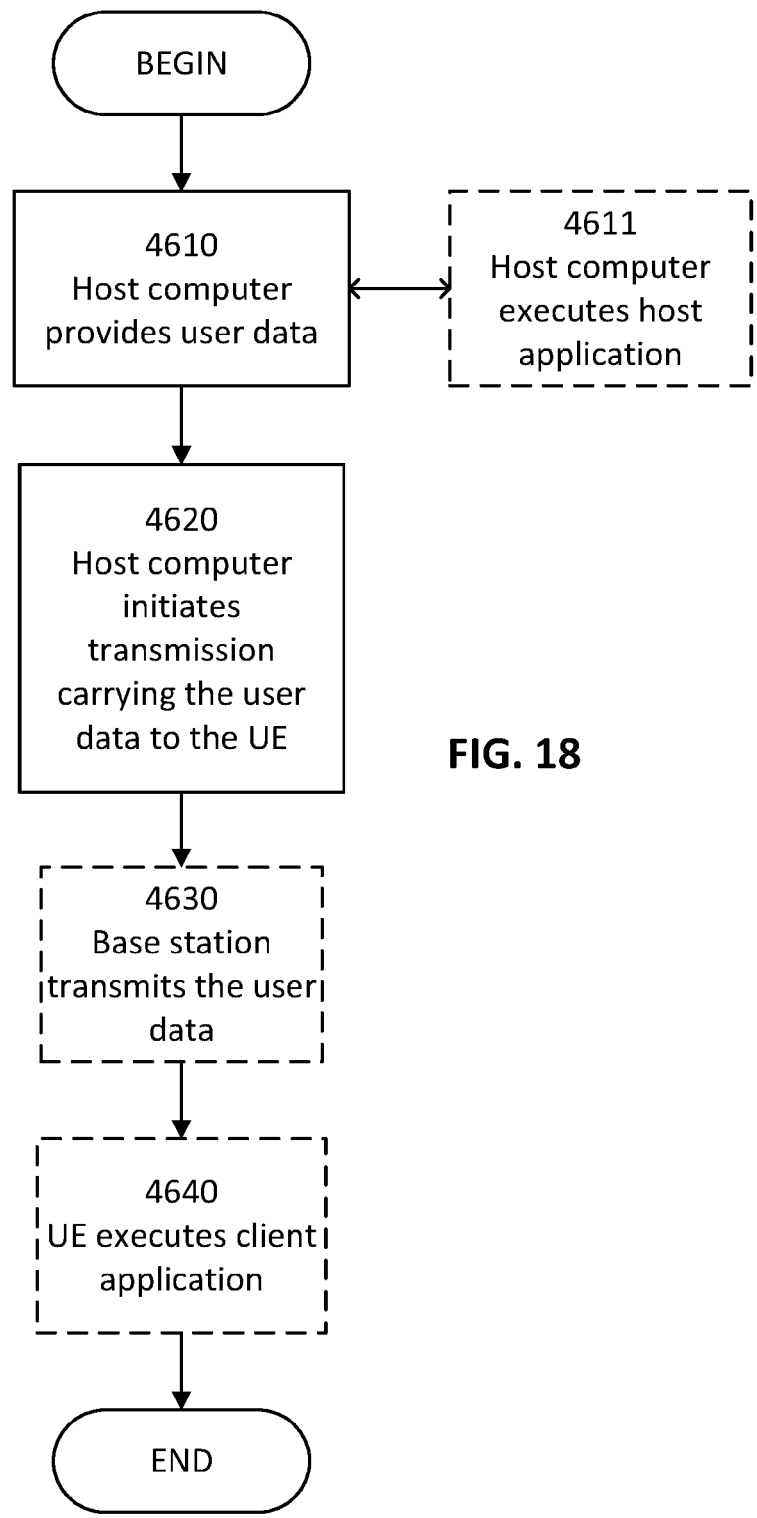
FIG. 18 is a block diagram of methods implemented in a communication system including a host computer, a base station and a user equipment in accordance with some embodiments.

FIG. 18 illustrates methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 19:
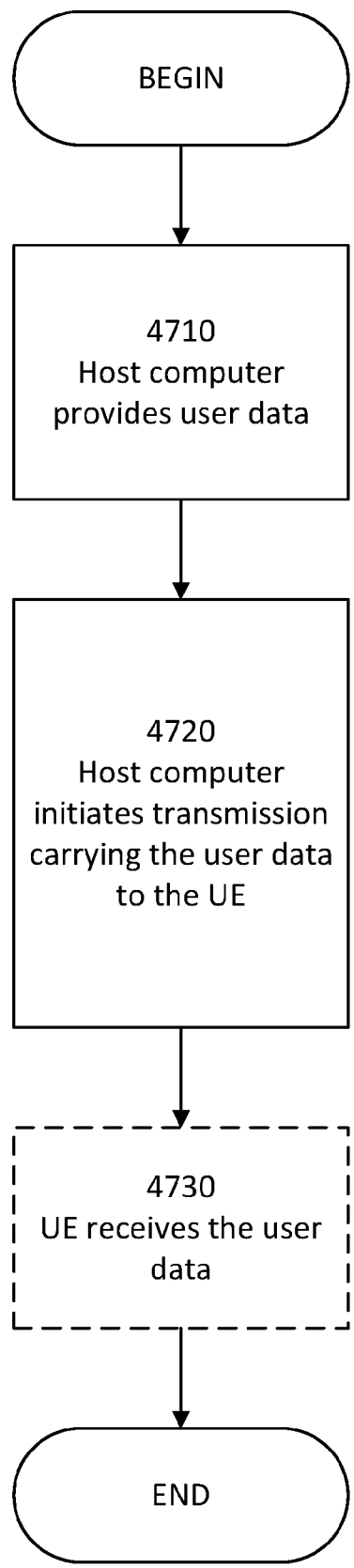
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 20:
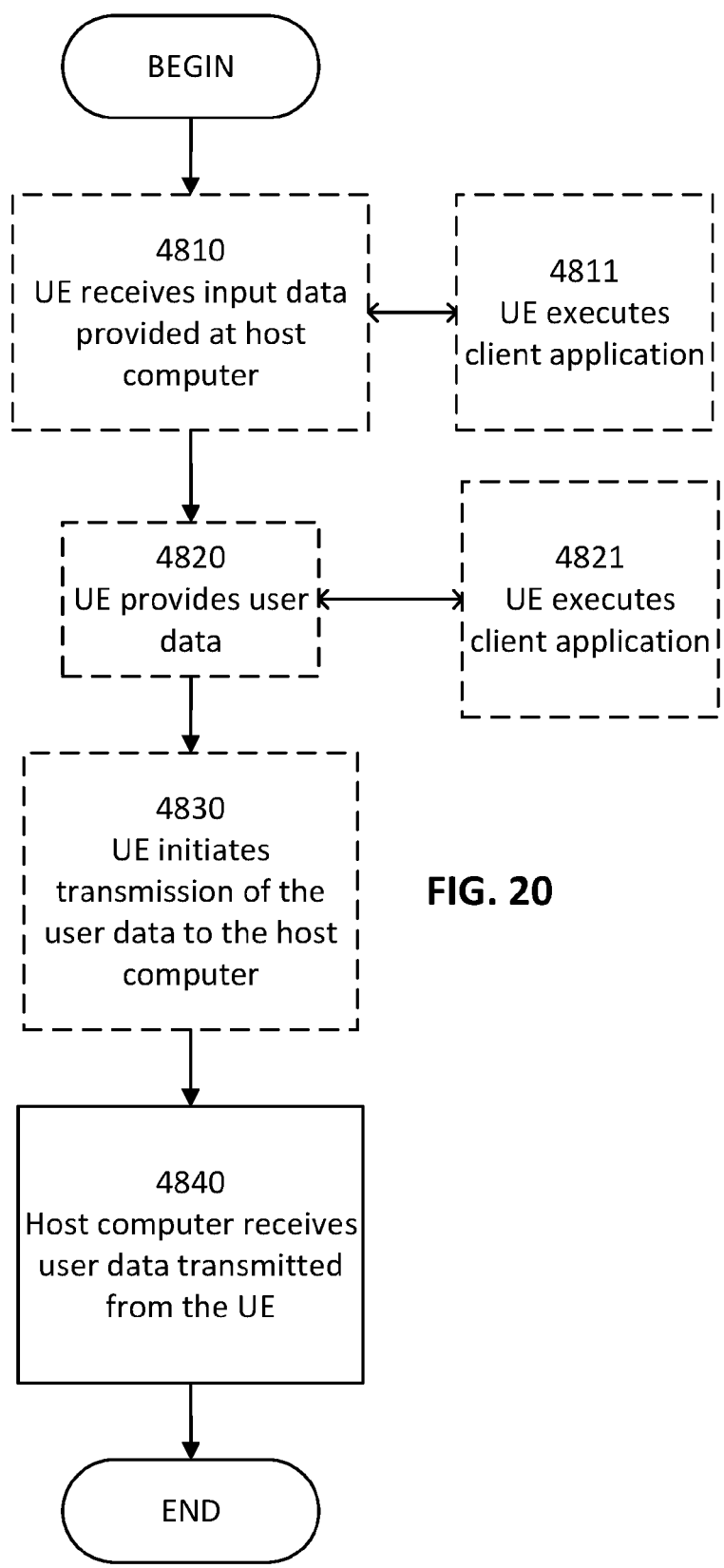
FIG. 20 is a block diagram of methods implemented in a communication system including a host computer, a base station and a user equipment in accordance with some embodiments.

FIG. 20 illustrates methods implemented in a communication system including a host computer, a base station and a user equipment in accordance with some embodiments FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 21:
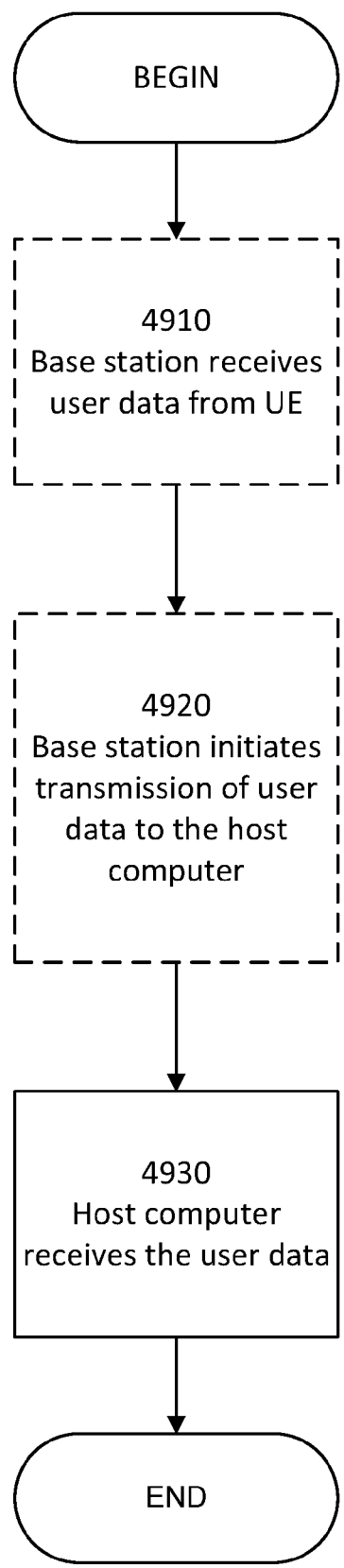
FIG. 21 is a block diagram of methods implemented in a communication system including a host computer, a base station and a user equipment in accordance with some embodiments.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 1x RTT | CDMA2000 1x Radio Transmission Technology |
| 3GPP | 3rd Generation Partnership Project |
| 5G | 5th Generation |
| ABS | Almost Blank Subframe |
| ARQ | Automatic Repeat Request |
| AWGN | Additive White Gaussian Noise |
| BCCH | Broadcast Control Channel |
| BCH | Broadcast Channel |
| CA | Carrier Aggregation |
| CC | Carrier Component |
| CCCH SDU | Common Control Channel SDU |
| CDMA | Code Division Multiplexing Access |
| CGI | Cell Global Identifier |
| CIR | Channel Impulse Response |
| CP | Cyclic Prefix |
| CPICH | Common Pilot Channel |
| CPICH | Ec/No CPICH Received energy per chip divided by the power density in the band |
| CQI | Channel Quality information |
| C-RNTI | Cell RNTI |
| CSI | Channel State Information |
| DCCH | Dedicated Control Channel |
| DL | Downlink |
| DM | Demodulation |
| DMRS | Demodulation Reference Signal |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| E-SMLC | Evolved-Serving Mobile Location Centre |
| ECGI | Evolved CGI |
| eNB | E-UTRAN NodeB |
| ePDCCH | enhanced Physical Downlink Control Channel |
| E-SMLC | evolved Serving Mobile Location Center |
| E-UTRA | Evolved UTRA |
| E-UTRAN | Evolved UTRAN |
| FDD | Frequency Division Duplex |
| FFS | For Further Study |
| GERAN | GSM EDGE Radio Access Network |
| gNB | Base station in NR |
| GNSS | Global Navigation Satellite System |
| GSM | Global System for Mobile communication |
| HARQ | Hybrid Automatic Repeat Request |
| HO | Handover |
| HSPA | High Speed Packet Access |
| HRPD | High Rate Packet Data |
| LOS | Line of Sight |
| LPP | LTE Positioning Protocol |
| LTE | Long-Term Evolution |
| MAC | Medium Access Control |
| MBMS | Multimedia Broadcast Multicast Services |
| MBSFN | Multimedia Broadcast multicast service Single Frequency Network |
| MBSFN ABS | MBSFN Almost Blank Subframe |
| MDT | Minimization of Drive Tests |
| MIB | Master Information Block |
| MME | Mobility Management Entity |
| MSC | Mobile Switching Center |
| NPDCCH | Narrowband Physical Downlink Control Channel |
| NR | New Radio |
| OCNG | OFDMA Channel Noise Generator |
| OFDM | Orthogonal Frequency Division Multiplexing |
| OFDMA | Orthogonal Frequency Division Multiple Access |
| OSS | Operations Support System |
| OTDOA | Observed Time Difference of Arrival |
| O&M | Operation and Maintenance |
| PBCH | Physical Broadcast Channel |
| P-CCPCH | Primary Common Control Physical Channel |
| PCell | Primary Cell |
| PCFICH | Physical Control Format Indicator Channel |
| PDCCH | Physical Downlink Control Channel |
| PDP | Profile Delay Profile |
| PDSCH | Physical Downlink Shared Channel |
| PGW | Packet Gateway |
| PHICH | Physical Hybrid-ARQ Indicator Channel |
| PLMN | Public Land Mobile Network |
| PMI | Precoder Matrix Indicator |
| PRACH | Physical Random Access Channel |
| PRS | Positioning Reference Signal |
| PSS | Primary Synchronization Signal |
| PUCCH | Physical Uplink Control Channel |
| PUSCH | Physical Uplink Shared Channel |
| RACH | Random Access Channel |
| QAM | Quadrature Amplitude Modulation |
| RAN | Radio Access Network |
| RAT | Radio Access Technology |
| RLM | Radio Link Management |
| RNC | Radio Network Controller |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |
| RSSI | Received Signal Strength Indicator |
| RSTD | Reference Signal Time Difference |
| SCH | Synchronization Channel |
| SCell | Secondary Cell |

| | |
|---|---|
| SDU | Service Data Unit |
| SFN | System Frame Number |
| SGW | Serving Gateway |
| SI | System Information |
| SIB | System Information Block |
| SNR | Signal to Noise Ratio |
| SON | Self Optimized Network |
| SS | Synchronization Signal |
| SSS | Secondary Synchronization Signal |
| TDD | Time Division Duplex |
| TDOA | Time Difference of Arrival |
| TOA | Time of Arrival |
| TSS | Tertiary Synchronization Signal |
| TTI | Transmission Time Interval |
| UE | User Equipment |
| UL | Uplink |
| UMTS | Universal Mobile Telecommunication System |
| USIM | Universal Subscriber Identity Module |
| UTDOA | Uplink Time Difference of Arrival |
| UTRA | Universal Terrestrial Radio Access |
| UTRAN | Universal Terrestrial Radio Access Network |
| WCDMA | Wide CDMA |
| WLAN | Wide Local Area Network |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a communication device in a communication network, the method comprising:
   determining that a downlink control information, DCI, resource and a downlink data resource overlap;
   detecting DCI on the DCI resource that overlaps with the downlink data resource;
   one or both of skipping monitoring and decoding portions of one or both of at least one of the downlink data resource and the DCI resource based on the DCI resource and the downlink data resource overlapping, the one or both of skipping monitoring and decoding comprising one or both of skipping monitoring and decoding a portion of the downlink data resource that overlaps with the DCI resource responsive to detecting the DCI on the DCI resource; and
   one or both of:
      the DCI comprising one or more of a scheduled uplink grant, a scheduled downlink assignment, a configured uplink grant, a semi-persistent scheduling, SPS, downlink assignment, and a re-activation command of the SPS downlink assignment associated with the downlink data resource; and
      the DCI comprising the re-activation command of the SPS downlink assignment associated with the downlink data resource, the re-activation command comprising one or more of feedback information for the downlink data resource, modulation information for the downlink data resource, coding information for the downlink data resource, repetition information for the downlink data resource, hybrid automatic repeat request information for the downlink data resource, and an allocation for a data repetition for the downlink data resource.

2. The method of claim 1, wherein the portion comprises a first portion of the downlink data resource that overlaps with the DCI resource, wherein a second portion of the downlink data resource does not overlap with the DCI resource, and wherein the one of both of the skipping monitoring and decoding comprises one of both of skipping monitoring and decoding the first and second portions of the downlink data resource.

3. The method of claim 1, wherein the portion comprises a first portion of the downlink data resource that overlaps with the DCI resource, and wherein a second portion of the downlink data resource does not overlap with the DCI resource, wherein the one of both of the skipping monitoring and decoding comprises one or both of skipping monitoring and decoding the first portion of the downlink data resource; and
   the method further comprising decoding the second portion of the downlink data resource that does not overlap with the DCI resource.

4. The method of claim 2, wherein the first portion of the downlink data resource overlaps with the DCI resource in a time domain, and wherein the second portion of the downlink data resource does not overlap with the DCI resource in the time domain.

5. The method of claim 2, wherein the first portion of the downlink data resource overlaps with the DCI resource in a frequency domain.

6. The method of claim 1, wherein an entirety of the downlink data resource overlaps with the DCI resource in a time domain, and wherein skipping monitoring and/or decoding comprises one or both of skipping monitoring and decoding the entirety of the downlink data resource.

7. The method of claim 1, wherein the entirety of the downlink data resource overlaps with the DCI resource in a frequency domain.

8. The method of claim 1, further comprising: responsive to detecting DCI on the DCI resource that overlaps with the downlink data resource, decoding the DCI on the DCI resource.

9. The method of claim 8, wherein the DOI is detected on the DCI resource that overlaps with the downlink data resource based on at least one of detecting a demodulation reference signal, DMRS, of DCI resource and checking cyclic redundancy checksum, CRC, bits of the DCI resource.

10. The method of claim 8, wherein detecting the DCI comprises detecting the DCI based on blind decoding using one or both of the DMRS of the DCI resource and the CRC bits of the DCI resource.

11. The method of claim 1, further comprising:
   detecting reference signals from a portion of the downlink data resource that overlaps with the DCI resource; wherein skipping comprises one or both of skipping monitoring and decoding of the DCI resource responsive to detecting reference signals from the portion of the downlink data resource that overlaps with the DCI resource.

12. The method of claim 11, further comprising:
   decoding the downlink data resource that overlaps with the DCI resource responsive to detecting the reference signals.

13. The method of claim 1, further comprising:
   detecting reference signals from a portion of the downlink data resource that overlaps with the DCI resource; and
   wherein skipping comprises one or both of skipping monitoring and decoding of the downlink data resource responsive to detecting reference signals from the portion of the downlink data resource that overlaps with the DCI resource.

14. The method of claim 13, further comprising decoding DCI from the DCI resource responsive to detecting the reference signals.

15. The method of claim 1, wherein the DCI resource overlaps with the downlink data resource in a time domain without overlapping in a frequency domain, or wherein the DCI resource overlaps with the downlink data resource in a time domain and in a frequency domain.

16. The method of claim 1, wherein on or both of:
   the DCI resource is provided using a physical downlink control channel, PDCCH; and
   the downlink data resource is provided using a physical downlink shared channel, PDSCH.

17. A communication device comprising:
processing circuitry; and
memory coupled with the processing circuitry, the memory including instructions that when executed by the processing circuitry cause the communication device to:
determine that a downlink control information, DCI, resource and a downlink data resource overlap;
detect DCI on the DCI resource that overlaps with the downlink data resource:
skip one or both of monitoring and decoding portions of one or both of the downlink data resource and the DCI resource based on the DCI resource and the downlink data resource overlapping, the one or both of skipping monitoring and decoding comprising one or both of skipping monitoring and decoding a portion of the downlink data resource that overlaps with the DOI resource responsive to detecting the DCI on the DCI resource, and
one or both of:
    the DCI comprising one or more of a scheduled uplink grant, a scheduled downlink assignment, a configured uplink grant, a semi-persistent scheduling, SPS, downlink assignment, and a re-activation command of the SPS downlink assignment associated with the downlink data resource; and
    the DCI comprising the re-activation command of the SPS downlink assignment associated with the downlink data resource, the re-activation command comprising one or more of feedback information for the downlink data resource, modulation information for the downlink data resource, coding information for the downlink data resource, repetition information for the downlink data resource, hybrid automatic repeat request information for the downlink data resource, and an allocation for a data repetition for the downlink data resource.

18. A non-transitory storage medium including program code to be executed by processing circuitry of a communication device, whereby execution of the program code causes the communication device to:
determine that a downlink control information, DCI, resource and a downlink data resource overlap:
detect DCI on the DCI resource that overlaps with the downlink data resource;
one or both of skip monitoring and decoding portions of one or both of the downlink data resource and the DCI resource based on the DCI resource and the downlink data resource overlapping, the one or both of skipping monitoring and decoding comprising one or both of skipping monitoring and decoding a portion of the downlink data resource that overlaps with the DCI resource responsive to detecting the DCI on the DCI resource; and
one or both of:
    the DCI comprising one or more of a scheduled uplink grant, a scheduled downlink assignment, a configured uplink grant, a semi-persistent scheduling, SPS, downlink assignment, and a re-activation command of the SPS downlink assignment associated with the downlink data resource; and
    the DCI comprising the re-activation command of the SPS downlink assignment associated with the downlink data resource, the re-activation command comprising one or more of feedback information for the downlink data resource, modulation information for the downlink data resource, coding information for the downlink data resource, repetition information for the downlink data resource, hybrid automatic repeat request information for the downlink data resource, and an allocation for a data repetition for the downlink data resource.

* * * * *